(12) United States Patent
Wang et al.

(10) Patent No.: US 9,140,880 B2
(45) Date of Patent: Sep. 22, 2015

(54) ZOOM LENS AND ZOOM LENS MODULE

(71) Applicants: Kuo-Chuan Wang, Hsinchu (TW);
Kuo-Shu Hung, Hsinchu (TW); Hsin-Te Chen, Hsinchu (TW)

(72) Inventors: Kuo-Chuan Wang, Hsinchu (TW);
Kuo-Shu Hung, Hsinchu (TW); Hsin-Te Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 92 days.

(21) Appl. No.: 13/929,801

(22) Filed: Jun. 28, 2013

(65) Prior Publication Data

US 2014/0002715 A1    Jan. 2, 2014

(30) Foreign Application Priority Data

Jun. 29, 2012  (TW) .............................. 101123474 A

(51) Int. Cl.
*G02B 13/00*        (2006.01)
*G02B 15/177*       (2006.01)

(52) U.S. Cl.
CPC ............ *G02B 13/009* (2013.01); *G02B 15/177* (2013.01)

(58) Field of Classification Search
CPC ...... G02B 13/009; G02B 15/14; G02B 15/15; G02B 15/167; G02B 15/177; G02B 15/24; G02B 15/16; G02B 17/026; G02B 17/04
USPC .......... 359/676, 678, 683, 684, 686, 680–682
See application file for complete search history.

(56) References Cited

U.S. PATENT DOCUMENTS

| 7,180,684 | B1 | 2/2007 | Ori |
| 7,286,299 | B2 | 10/2007 | Matsui |
| 7,339,744 | B2 * | 3/2008 | Hankawa et al. ............. 359/682 |
| 7,375,901 | B2 | 5/2008 | Tanaka |
| 7,466,500 | B2 | 12/2008 | Souma et al. |
| 2006/0221212 | A1 | 10/2006 | Hankawa et al. |

(Continued)

FOREIGN PATENT DOCUMENTS

| JP | 2004-205796 | 7/2004 |
| JP | 2007-093955 | 4/2007 |
| JP | 2007-232974 | 9/2007 |

(Continued)

OTHER PUBLICATIONS

"Office Action of Taiwan Counterpart Application", issued May 6, 2014, p. 1-p. 5.

(Continued)

*Primary Examiner* — Ricky Mack
*Assistant Examiner* — Gary O'Neill
(74) *Attorney, Agent, or Firm* — Jianq Chyun IP Office

(57) ABSTRACT

A zoom lens and a zoom lens module are provided. The zoom lens is configured to form an image of an object at an object side onto an image plane at an image side. The zoom lens includes a first lens group, a second lens group, a third lens group and a fourth lens group disposed in sequence from the object side towards the image side. The refractive powers of the first lens group, the second lens group, and the third lens group are negative, positive, and negative, respectively. The zoom lens satisfies $1.90 < |T_{1G}/F_W| < 2.40$. $T_{1G}$ is a distance of the first lens group along an optical axis of the zoom lens, and $F_W$ is an effective focal length of the zoom lens when the zoom lens is at a wide-end.

45 Claims, 14 Drawing Sheets

(56) References Cited

U.S. PATENT DOCUMENTS

| | | | |
|---|---|---|---|
| 2007/0201143 A1* | 8/2007 | Kohno et al. | 359/680 |
| 2012/0026603 A1 | 2/2012 | Wang et al. | |

FOREIGN PATENT DOCUMENTS

| | | |
|---|---|---|
| JP | 2011-059494 | 3/2011 |
| JP | 2011-69962 | 4/2011 |
| JP | 2011-237737 | 11/2011 |
| TW | 201205113 | 2/2012 |

OTHER PUBLICATIONS

"Office Action of Japan Counterpart Application", issued on Apr. 30, 2014, p. 1-p. 3.

"Office Action of China Counterpart Application", issued on Mar. 17, 2015, p. 1-p. 6.

* cited by examiner

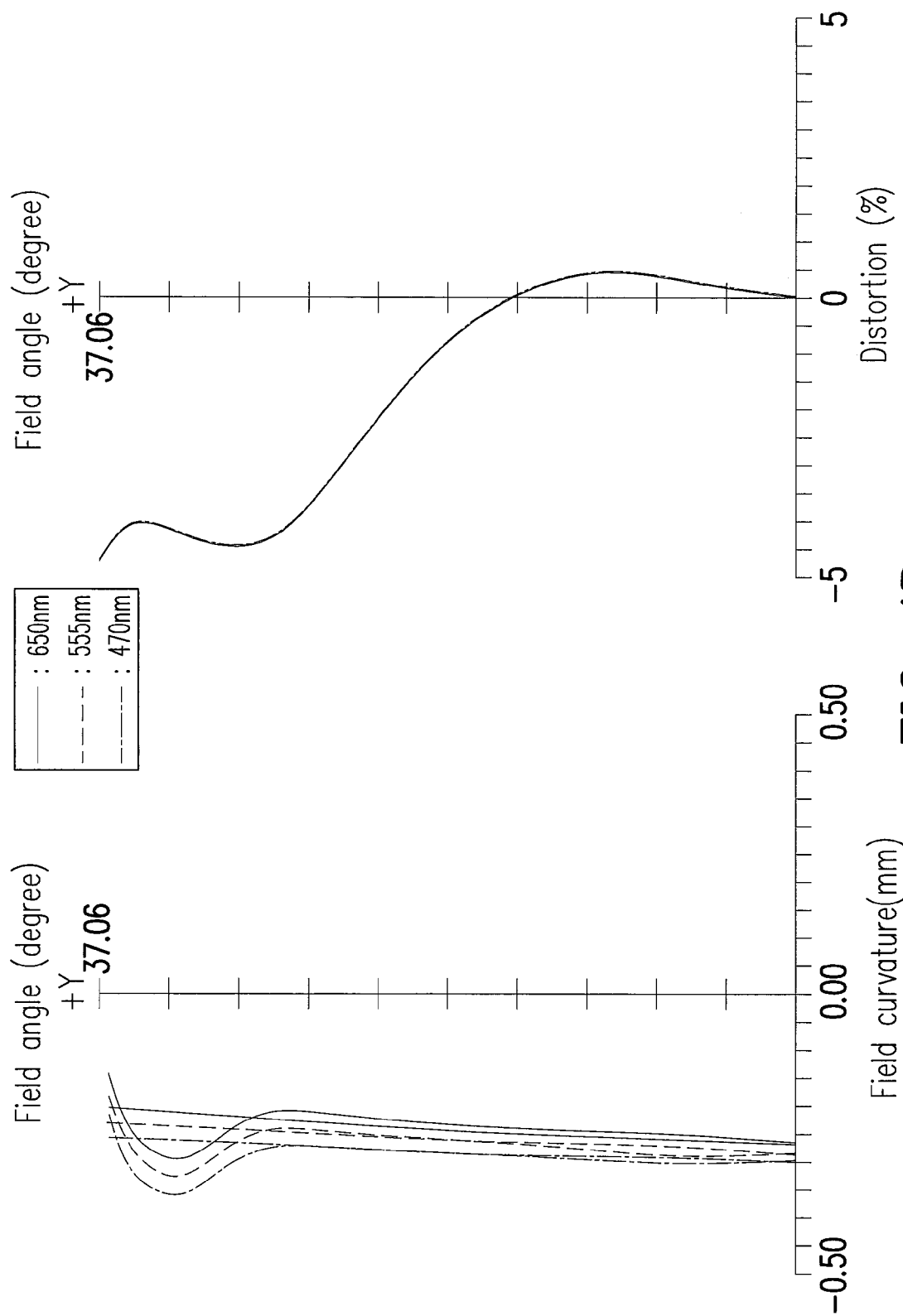

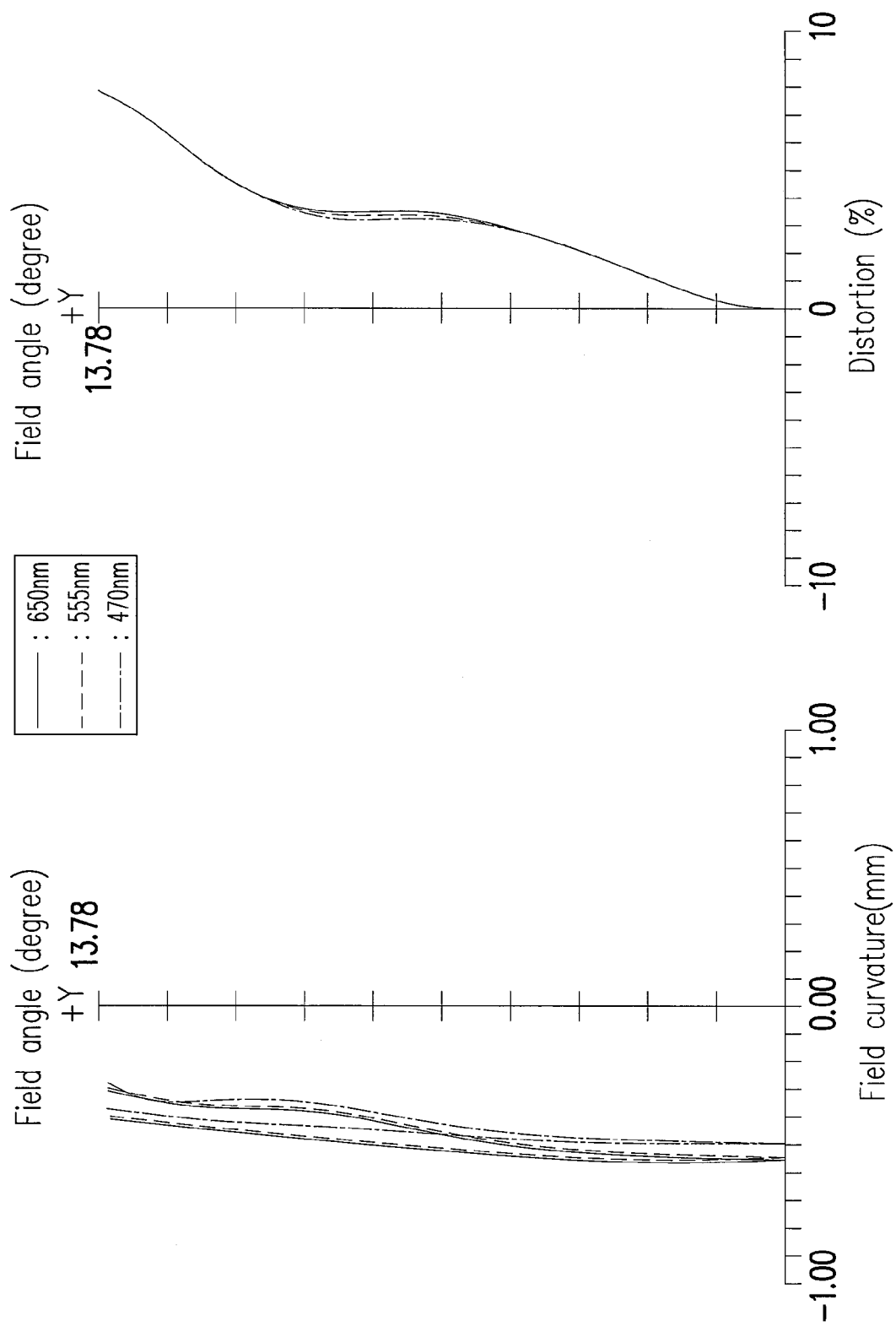

ZOOM LENS AND ZOOM LENS MODULE

CROSS-REFERENCE TO RELATED APPLICATION

This application claims the priority benefit of Taiwan application serial no. 101123474, filed on Jun. 29, 2012. The entirety of the above-mentioned patent application is hereby incorporated by reference herein and made a part of this specification.

BACKGROUND

1. Field of the Invention

The invention relates to a lens and a lens module, and more particularly, to a zoom lens and a zoom lens module.

2. Description of Related Art

Following advances in modern video technology, demands for high-pixel, high-quality lens of digital video camera (DVC) and digital camera (DC) are gradually increasing in recent years, and are developing towards miniaturization, large aperture and wide viewing angle. A core component of the imaging devices is a zoom lens, far and near images can be formed more clearly via an optical zoom of the zoom lens; therefore, an optical quality of the zoom lens is closely related to an imaging quality of the images. In a highly competitive market, various companies are all committed to improve the quality of the zoom lens and reduce a production costs thereof, so as to enhance competitive advantages of the imaging devices.

Nevertheless, a current design of a periscope-type zoom lens, due to a relative difficulty in processing, and subjected to a more strict tolerance, is more difficult to achieve all of a high-resolution feature, a large aperture advantage and a wide viewing angle. Moreover, a small aperture is prone to dilemmas of a shortage of luminous flux, more noises and under-exposure when applied in a night use of the digital camera. For example, F-numbers of the apertures disclosed in U.S. Pat. No. 7,466,500 and U.S. Pat. No. 7,180,684 are both 3.5 or more, and thus are easily faced with a problem of inadequate luminous flux.

In addition, a zoom lens provided by U.S. Pat. No. 7,286,299 not only fails to meet the demands of large aperture but also has a small field of view (FOV) (2ω), thus leading to shortcomings of shooting range shrinkage and inadequate luminous flux, such that the user demands are not able to be fulfilled.

Besides, a zoom lens is disclosed in U.S. Pat. No. 7,375,901, wherein the zoom lens includes four lens groups. Furthermore, a zoom lens including four lens groups is also disclosed in US Patent Application Publication No. 20120026603.

SUMMARY OF THE INVENTION

The invention provides a zoom lens and a zoom lens module capable of being applied in a framework of miniaturization and having a favorable quality of optical imaging.

Other advantages of the invention may be better understood from technical features disclosed in the following.

In order to achieve a part, entire or other advantages mentioned above, an embodiment of the invention provides a zoom lens configured to form an image of an object at an object side onto an image plane at an image side. The zoom lens includes a first lens group, a second lens group, a third lens group, and a fourth lens group. The first lens group is disposed between the object side and the image side, and has a negative refractive power. The second lens group is disposed between the first lens group and the image side, and has a positive refractive power. The third lens group is disposed between the second lens group and the image side, and has a negative refractive power. The fourth lens group is disposed between the third lens group and the image side. In addition, the first lens group and the fourth lens group are each a fixed group, and the second lens group is capable of moving with respect to the first lens group to achieve zooming. The third lens group is capable of moving with respect to the first lens group to achieve focusing. The zoom lens satisfies $1.90 < |T_{1G}/F_W| < 2.40$, wherein $T_{1G}$ is a distance of the first lens group along an optical axis of the zoom lens, and $F_W$ is an effective focal length of the zoom lens at a wide-end.

An embodiment of the invention provides a zoom lens configured to form an image of an object at an object side onto an image plane at an image side. The zoom lens includes a first lens group, a second lens group, a third lens group and a fourth lens group. The first lens group is disposed between the object side and the image side, and has a negative refractive power. In addition, the first lens group includes a first lens, a prism and a second lens sequentially arranged from the object side towards the image side, and the first lens is connected to an actuator, wherein when the zoom lens vibrates towards a first direction, the actuator causes the first lens to deviate from an optical axis of the zoom lens towards the first direction. The second lens group is disposed between the first lens group and the image side, and has a positive refractive power. The third lens group is disposed between the second lens group and the image side, and has a negative refractive power. The fourth lens group is disposed between the third lens group and the image side, wherein the first lens group and the fourth lens group are each a fixed group, the second lens group is capable of moving with respect to the first lens group to achieve zooming, and the third lens group is capable of moving with respect to the first lens group to achieve focusing. The zoom lens satisfies $16 \geq C.R.A.(W)/ImgH \geq 10$ and $15 \geq C.R.A.(T)/ImgH \geq 7$, wherein C.R.A.(W) is an incident angle for a chief ray of the zoom lens at a wide-end incident on a maximum field of the image plane, C.R.A.(T) is an incident angle for a chief ray of the zoom lens at a tele-end incident on the maximum field of the image plane, and ImgH is a maximum image height of the image plane.

An embodiment of the invention provides a zoom lens module configured to form an image of an object at an object side onto an image plane at an image side. The zoom lens module includes a zoom lens and an optical detector. The zoom lens includes a first lens group, a second lens group, a third lens group, and a fourth lens group. The first lens group is disposed between the object side and the image side, and has a negative refractive power. The second lens group is disposed between the first lens group and the image side, and has a positive refractive power. The third lens group is disposed between the second lens group and the image side, and has a negative refractive power. The fourth lens group is disposed between the third lens group and the image side. The optical detector is disposed at the image side, wherein the zoom lens forms the image of the object onto the optical detector. In addition, the first lens group and the fourth lens group are each a fixed group, the second lens group is capable of moving with respect to the first lens group to achieve zooming, and the third lens group is capable of moving with respect to the first lens group to achieve focusing. The zoom lens satisfies $16 \geq C.R.A.(W)/ImgH \geq 10$ and $15 \geq C.R.A.(T)/ImgH \geq 7$, wherein C.R.A.(W) is an incident angle for a chief ray of the zoom lens at a wide-end incident on a maximum field of the optical detector, C.R.A.(T) is an incident angle for a chief ray of the zoom lens at a tele-end incident on the maximum field of the optical detector, and ImgH is a maximum image height of the optical detector.

The embodiments of the invention may achieve at least one of the following advantages. In the zoom lens and the zoom lens module according to the embodiments of the invention, under a condition that the first lens group, the second lens group, the third lens group, and the fourth lens group in combination with each other and the zoom lens module satisfies $16 \geq C.R.A.(W)/ImgH \geq 10$ and $15 \geq C.R.A.(T)/ImgH \geq 7$, the zoom lens module may be applied to in a framework of miniaturization and have a favorable quality of optical imaging.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4A to FIG. 4B are imaging optical simulation curves in correspondence to Table 4 and the zoom lens module, which is at a wide-end, in FIG. 3.

FIG. 4C to FIG. 4D are imaging optical simulation curves in correspondence to Table 4 and the zoom lens module, which is at a tele-end, in FIG. 3.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
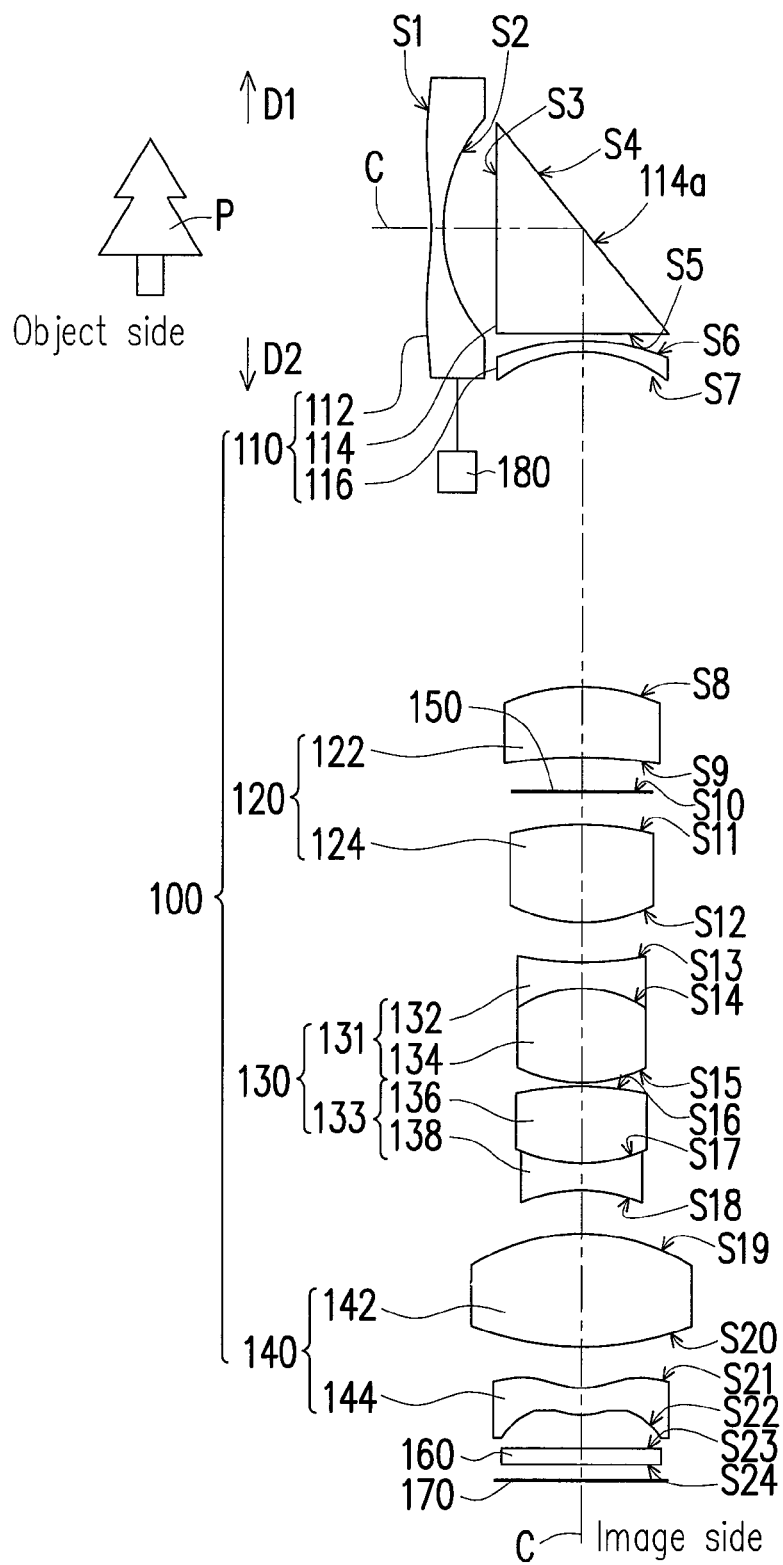
FIG. 1A to FIG. 1D are structural diagrams schematically illustrating a zoom lens module under different zooming magnifications according to an embodiment of the invention.
Figure 1B:
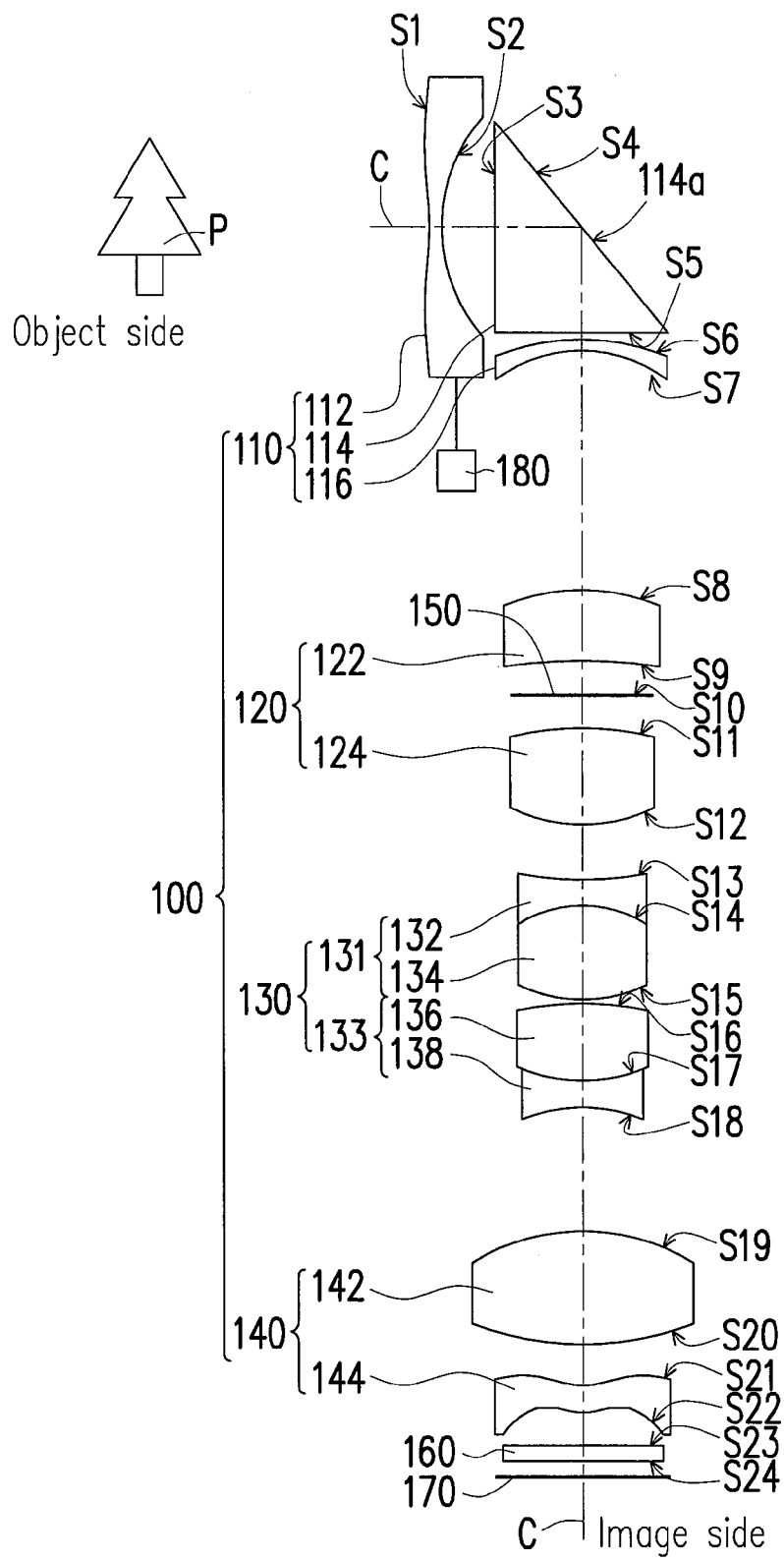
Figure 1C:
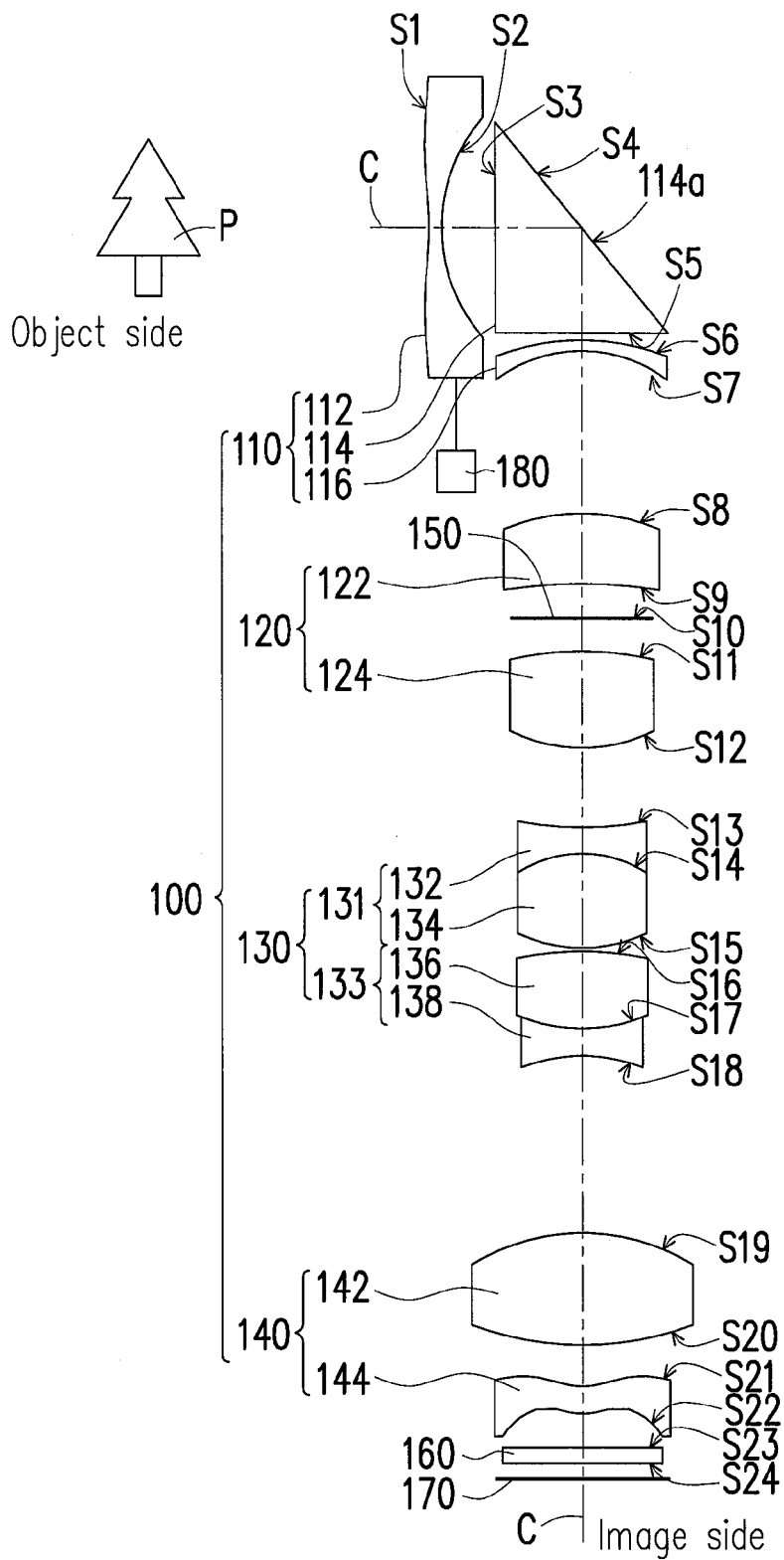
Figure 1D:
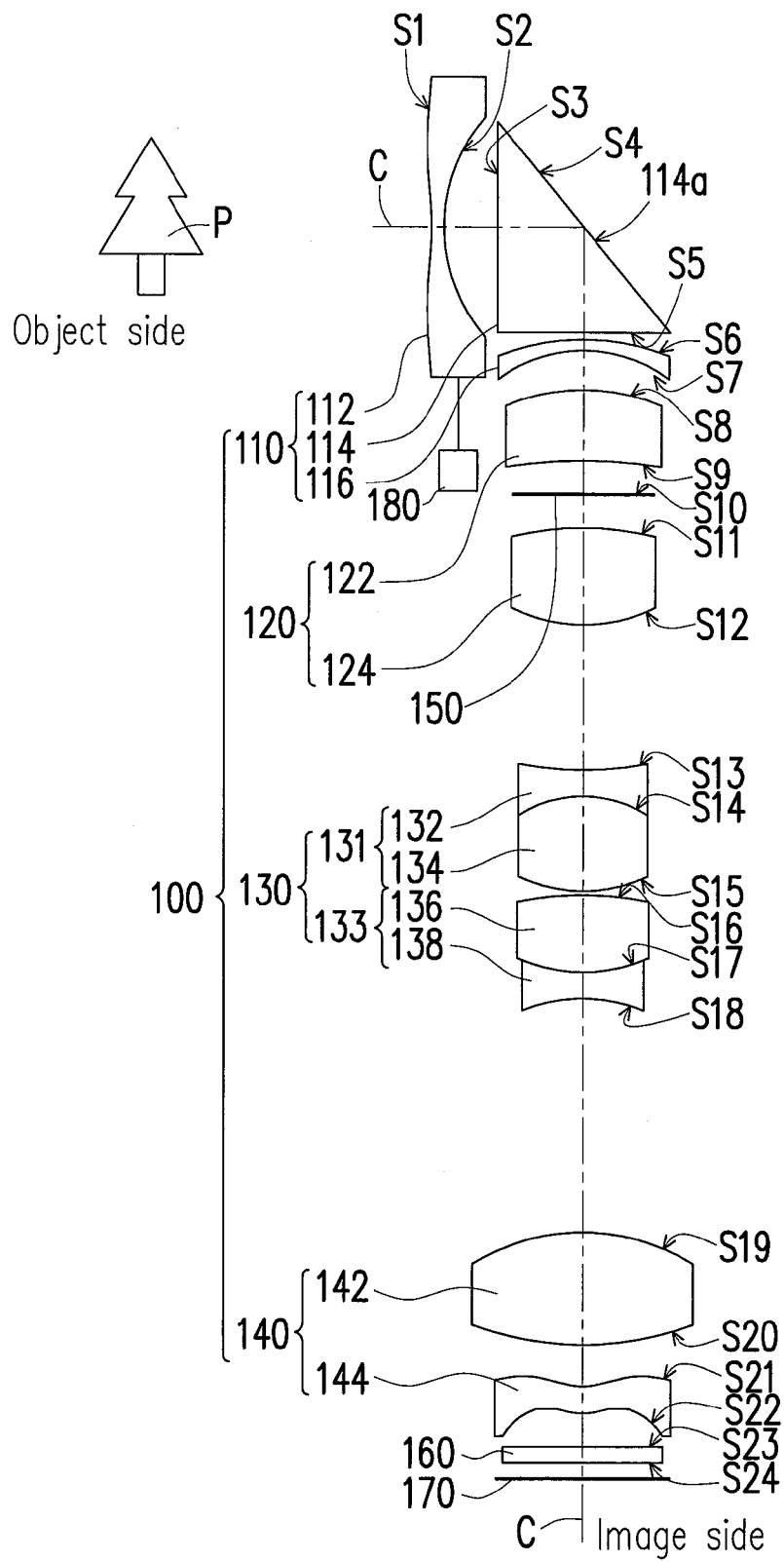

FIG. 1A to FIG. 1D are structural diagrams schematically illustrating a zoom lens module under different zooming magnifications according to an embodiment of the invention, wherein FIG. 1A illustrates the structure of the zoom lens module at a wide-end, FIG. 1B illustrates the structure of the zoom lens module at a first middle location, FIG. 1C illustrates the structure of the zoom lens module at a second middle location, and FIG. 1D illustrates the structure of the zoom lens module at a tele-end.

Referring to FIG. 1A to FIG. 1D, the zoom lens module 1000 in this embodiment is disposed between an object side and an image side. The zoom lens module 1000 is configured to form an image of an object P at the object side onto an image plane at the image side, wherein the zoom lens module 1000 includes a zoom lens 100 and an optical detector 170.

In detail, the zoom lens 100 includes a first lens group 110, a second lens group 120, a third lens group 130, and a fourth lens group 140 sequentially arranged from the object side towards the image side. The first lens group 110 is disposed between the object side and the image side, and has a negative refractive power. The second lens group 120 is disposed between the first lens group 110 and the image side, and has a positive refractive power. The third lens group 130 is disposed between the second lens group 120 and the image side, and has a negative refractive power. The fourth lens group 140 is disposed between the third lens group 130 and the image side. In this embodiment, the fourth lens group 140 has a positive refractive power. Specifically, the first lens group 110 and the fourth lens group 140 are each a fixed group; namely, the first lens group 110 and the fourth lens group 140 are remained at fixed positions without moving with respect to the entire zoom lens 100, the second lens group 120 is capable of moving with respect to the first lens group 110 to achieve zooming, and the third lens group 130 is capable of moving with respect to the first lens group 110 to achieve focusing.

In addition, an amount of lenses included within each of the second lens group 120, the third lens group 130 and the fourth lens group 140 is an even number. For example, an amount of lenses within the second lens group 120 are two, an amount of lenses within the third lens group 130 are four, and an amount of lenses within the fourth lens group 140 are two. Furthermore, the first lens group 110 includes two negative lenses sequentially arranged from the object side towards the image side, the fourth lens group 140 includes a positive lens and a negative lens sequentially arranged from the object side towards the image side, and the third lens group 130 includes two cemented lenses, wherein each cemented lens includes two spherical glass lenses, and no aspherical lens is included in the third lens group 130.

In this embodiment, the optical detector 170 is disposed at the image side, and a sensing region on the optical detector 170 may form an image plane. The zoom lens 100 may form an image of the object P at the object side onto the optical detector 170; namely, the image is formed onto the image plane. The optical detector 170 is, for example, a charge coupled device (CCD), a complementary metal-oxide-semiconductor sensor (CMOS sensor) or a photosensitive film.

The zoom lens module 1000 of this embodiment may satisfy the following conditions:

$$16 \geq C.R.A.(W)/ImgH \geq 10,$$

$$15 \geq C.R.A.(T)/ImgH \geq 7 \quad (1)$$

where C.R.A.(W) is an incident angle for a chief ray of the zoom lens module 1000 at a wide-end incident on a maximum field of the image plane (viz., a location on the image plane which is farthest away from an optical axis C of the zoom lens 100, and a distance from this location to the optical axis C is a maximum image height), and the incident angle may also be called a chief ray angle (C.R.A.). In addition, C.R.A.(T) is an incident angle for a chief ray of the zoom lens module 1000 at a tele-end incident on the maximum field of the image plane, and ImgH is a maximum image height of the image plane (viz., a distance from the location in the sensing region of the optical sensor 170 farthest away from the optical axis C of the zoom lens 100 to the optical axis C). When the an optical axis of the optical detector 170 and the optical axis C of the zoom lens 100 coincide with each other, the maximum image height is equal to half of the diagonal of the sensing region. The zoom lens module 1000 may be applied in a framework of miniaturization when satisfying the formula (1). For example, the zoom lens module 1000 may be applied as a mobile phone lens. This is because that a large chief ray angle is adapted to the optical detector 170 of the mobile phone lens.

In addition, the zoom lens module 1000 of this embodiment may satisfy the following condition:

$$TTL_W/TTL_T=1 \quad (2)$$

wherein $TTL_W$ is a total track of the zoom lens module 1000 at the wide-end, $TTL_T$ is a total track of the zoom lens module 1000 at the tele-end. It is noted that in terms of the framework of the zoom lens module 1000 in this embodiment, the total track is a distance from a point on a surface S1, facing the object side, of the lens (e.g., the first lens 110) in the zoom lens module 1000 nearest to the object side and on the optical axis C to the image plane of the optical detector 170 along the optical axis C. When the zoom lens module 1000 satisfies formula (2), the zoom lens 100 does not change the total track when zooming, and thus the zoom lens 100 is adapted to be a periscope lens.

In addition, the zoom lens module 1000 in this embodiment may satisfy the following condition:

$$9 \leq TTL_T/ImgH \leq 15 \quad (3)$$

where $TTL_T$ is a total track of the zoom lens module 1000 at the tele-end, and ImgH is a maximum height of the image plane.

The zoom lens module 1000 in this embodiment may further satisfy the following condition:

$$0.9<|F_{G2}/F_{G1}|<1.5 \quad (4)$$

where $F_{G1}$ is an effective focal length of the first lens group 110, and $F_{G2}$ is an effective focal length of the second lens group 120.

In addition, the zoom lens module 1000 in this embodiment may further satisfy the following conditions:

$$0.3<|F_W/F_{G2}|<0.9, \text{ and}$$

$$0.2<|F_W/F_{G3}|<0.9 \quad (5)$$

where $F_W$ is an effective focal length of the zoom lens module 1000 at the wide-end, $F_{G2}$ is an effective focal length of the second lens group 120, and $F_{G3}$ is an effective focal length of the third lens group 130. Therefore, the zoom lens module 1000 may achieve a favorable image quality when formula (5) is satisfied.

Consequently, when C.R.A.(W), C.R.A.(T), $TTL_W$, $TTL_T$, and ImgH satisfy the correlation formula (1) to the correlation formula (3), and when $F_W$, $F_{G1}$, $F_{G2}$, and $F_{G3}$ satisfy the correlation formula (4) to the correlation formula (5), the zoom lens module 1000 may capture an image with favorable quality on the image side.

The components of each lens group in the zoom lens module 1000 are described as follows, but the invention is not limited thereto.

Referring to the zoom lens 100 in FIG. 1A, the first lens group 110 includes a first lens 112, a prism 114 and a second lens 116 sequentially arranged from the object side towards the image side, and refractive powers of the first lens 112 and second lens 116 are both negative. In addition, the prism 114 has a reflecting surface 114a, and the reflecting surface 114a may reflect the light from the first lens 112 to the second lens 116. Specifically, a surface S3 of the prism 114 is a light incident surface, while a surface S5 of the prism 114 is a light emitting surface. The light from the first lens 112, after entering the prism 114 through the surface S3, is reflected by the reflecting surface 114a to the surface S5 and transmitted to the second lens 116 through the surface S5. In this embodiment, the reflecting surface 114a is, for example, a total reflection surface.

The second lens group 120 may include a third lens 122 and a fourth lens 124 sequentially arranged from the object side towards the image side, and refractive powers of the third lens 122 and fourth lens 124 are both positive. The third lens group 130 may include a fifth lens 132, a sixth lens 134, a seventh lens 136, and an eighth lens 138, and refractive powers of the fifth lens 132, the sixth lens 134, the seventh lens 136, and the eighth lens 138 are negative, positive, positive, and negative, respectively. In addition, the fifth lens 132 and the sixth lens 134 may form a double cemented lens 131, and the seventh lens 136 and the eighth lens 138 may form another double cemented lens 133. The fourth lens group 140 may include a ninth lens 142 and a tenth lens 144 sequentially arranged from the object side towards the image side, and refractive powers of the ninth lens 142 and the tenth lens 144 are positive and negative, respectively.

Specifically, the first lens 112 is, for example, a biconcave lens, and the second lens 116 is, for example, a negative meniscus lens with a concave surface facing the image side. The third lens 122 is, for example, a negative meniscus lens with a convex surface facing the object side, and the fourth lens 124 is, for example, a biconvex lens. The fifth lens 132 is, for example, a biconcave lens, the sixth lens 134 is, for example, a biconvex lens, the seventh lens 136 is, for example, a biconvex lens, and the eighth lens 138 is, for example, a biconcave lens. The ninth lens 142 is, for example, a biconvex lens, and the tenth lens 144 is, for example, a negative meniscus lens with a concave surface facing the object side. In addition, in the zoom lens 100 according to this embodiment, the first lens 112, the second lens 116, the fourth lens 124, and the tenth lens 144 may each be an aspherical lens.

The zoom lens module 1000 in this embodiment may satisfy the following condition:

$$1.90<|T_{1G}/F_W|<2.40 \quad (6)$$

wherein $T_{1G}$ is a distance from a surface of the first lens 112 in the first lens group 110 which faces towards the object side to a surface of the second lens 116 in the first lens group 110 which faces towards the image side (including the prism 114), namely, a distance along the optical axis C between the surface S1 to a surface S7, and $F_W$ is an effective focal length at the wide-end. When the correlation formula (6) is less than 1.90, a length of the first lens group 110 is lengthened, and thus unable to achieve the framework of miniaturization. When the correlation formula (6) is greater than 2.40 (viz., when T1G becomes smaller), the refractive power of the first lens group 110 is to become larger and causes an outer diameter of the first lens 112 in first lens group 110 to become larger, thus increasing a production cost and unable to achieve the framework of miniaturization.

The zoom lens module 1000 in this embodiment may satisfy the following condition:

$$1<CA_p(S3)/CA_{stp}<1.8 \quad (7)$$

wherein $CA_p(S3)$ represents a clear aperture of the surface S3 of the prism 114, and $CA_{stp}$ represents a clear aperture of an aperture stop 150.

The zoom lens 100 in this embodiment may further satisfy the following condition:

$$1.95>Nd_p>1.80 \quad (8)$$

wherein Nd is a refractive index of the prism 114. In this embodiment, since $1.95>Nd_p>1.80$, a size and a thickness of the prism 114 may be reduced, so as to achieve the framework of miniaturization.

On the other hand, the zoom lens 100 may satisfy the following conditions:

$$15<Vp<25, 25<V1<35 \text{ and } 20<V2<30 \quad (9)$$

wherein Vp is an Abbe number of the prism 114, V1 is an Abbe number of the ninth lens 142, and V2 is an Abbe number of the tenth lens 144.

Since the refractive powers of the four lens groups 110, 120, 130, and 140 of the zoom lens 100 in this embodiment use the above mentioned combination of negative, positive, negative, and positive, a degree of image aberration may be effectively minimized. In addition, in this embodiment, the zoom lens module 1000 may achieve a near three-times zoom ratio. As shown in FIG. 1A to FIG. 1D, when a magnification of the zoom lens module 1000 are gradually changing from the wide-end (illustrated in FIG. 1A) through a first middle location (illustrated in FIG. 1B) and a second middle location (illustrated in FIG. 1C) to the tele-end (illustrated in FIG. 1D) in sequence, the second lens group 120 and the third lens group 130 move from a side adjacent to the fourth lens group 140 to a side adjacent to the first lens group 110.

It is noted that the zoom ratio mentioned in this embodiment is a ratio between the maximum effective focal length and the minimum effective focal length in the zoom lens module 1000. In other words, when the second lens group 120 and the third lens group 130 move between the first lens group 110 and the fourth lens group 140, the effective focal length of the zoom lens module 1000 would change in a certain range, and the ratio of the maximum effective focal length to the minimum effective focal length is defined as the zoom ratio of the zoom lens module 1000.

Furthermore, the second lens group 120 may be seemed as a zooming group, the third lens group 130 may be seemed as a focusing group, and the second lens group 120 and the third lens group 130 are capable of moving with respect to and between the first lens group 110 and the fourth lens group 140. When the magnification is small, the second lens group 120 and the third lens group 130 are away from the first lens group 110, namely, the wide-end. When the magnification is large, the second lens group 120 and the third lens group 130 are close to the first lens group 110, namely, the tele-end. In other words, the zoom lens module 1000 in this embodiment may move the second lens group 120 and the third lens group 130 to achieve a near three-times zoom ratio.

Noteworthy, as shown in FIG. 1A, the first lens group 110 further includes a prism 114 with a reflecting surface 114a. With this, the prism 114 may turn a travelling direction of the light which is leaded to the zoom lens module 1000. Namely, an optical zooming function of the zoom lens module 1000 is completed within the zoom lens module 1000, and thus the miniaturization of the zoom lens module 1000 may be achieved. For example, since the zooming function of the zoom lens module 1000 can be completed within a device body, the zoom lens module 1000 may be disposed within a mobile phone to overcome a problem of poor quality of the mobile phone lens after digital zooming, or to be applied in the application of small digital video (DV) products.

On the other hand, since the refractive power of the fourth lens group 140 in this embodiment is positive, an incident light path, for a marginal ray that starts at the point where the object crosses the optical axis C of the zoom lens module 1000 and is then incident on the image plane, and the optical axis C make a larger included angle. Consequently, a numerical aperture (NA) of the zoom lens module 1000 may be enhanced and an F-number of the aperture may be reduced, thus achieving a characteristic of large aperture.

In addition, in this embodiment, the first lens 112, the second lens 116, the fourth lens 124, and the tenth lens 144 may each be an aspherical lens, and the remaining six lenses in the zoom lens module 1000 may be spherical lenses or aspherical lenses. With a collocation of the aspherical lenses and the spherical lenses, the zoom lens module 1000 may achieve the function of near three-times zoom ratio and have an advantage of high resolution. For example, the zoom lens module 1000 may be used in an application of high-resolution lens.

In order to enable the zoom lens module 1000 to have a more favorable optical quality, the zoom lens module 1000 may further include an aperture stop 150 located in the second lens group 120. In detail, the aperture stop 150 is disposed between the third lens 122 and the fourth lens 124 to control an amount of incident light.

In addition, the zoom lens module 1000 may also further include a cover glass 160 for protecting the optical detector 170, wherein the cover glass 160 may be disposed between the tenth lens 144 of the fourth lens group 140 and the optical detector 170. Especially, a surface S23 of the cover glass 160 which faces towards the tenth lens 144 or a surface S24 of the cover glass 160 which faces towards the optical detector 170 may have a function of light filtration. For example, an IR cutting film (not shown) may be attached onto the surface S23 or S24 of the cover glass 160 for blocking infrareds and allowing visible lights to pass through. With this, the cover glass 160 may protect the optical detector 170, and the IR cutting film may prevent the image captured by the optical detector 170 from easily having a color shift problem.

Figure 1E:
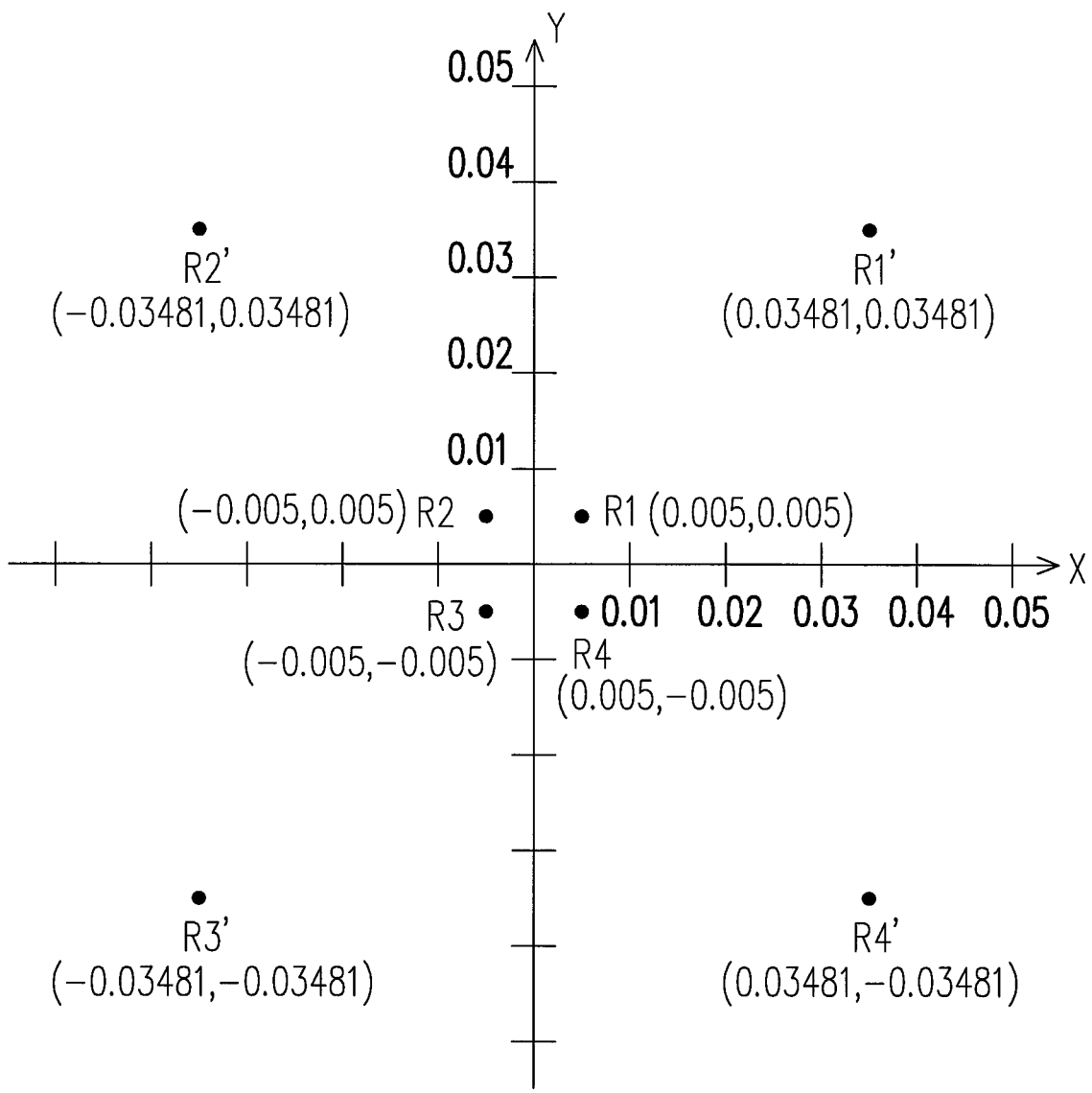
FIG. 1E is a diagram schematically illustrating a deviation direction of an optical axis of a first lens and a zoom lens in FIG. 1A with respect to an object side.

Moreover, an actuator 180 may be selectively disposed in the zoom lens module 1000 in this embodiment, wherein the actuator 180 may be connected to the first lens 110. When the zoom lens module 1000 vibrates towards a first direction D1 with respect to the object P, the actuator 180 causes the first lens 110 to deviate from the optical axis C of the zoom lens module 1000 towards the first direction D1. Consequently, since the first lens 110 may move in a same direction as that of the optical axis C of the zoom lens module 1000, the image formed on the image plane may be maintained in still. Otherwise, when the zoom lens module 1000 vibrates towards a second direction D2, the actuator 180 causes the first lens 110 to deviate from the optical axis C towards the second direction D2, so that the image formed on the image plane may still be maintained in still. This embodiment does not limit the first direction D1 and the second direction D2 to a certain direction, the directions thereof may be any direction which is perpendicular to the optical axis C, wherein the first direction D1 and the second direction D2 are substantially opposite directions. Table 1 explains a relationship between the deviating direction of the first lens 112 and the deviating direction of the optical axis C of the zoom lens 100. FIG. 1E is a diagram schematically illustrating a deviation directions of a first lens and an optical axis of a zoom lens in FIG. 1A with respect to an object side. Referring to Table 1 and FIG. 1E, an adjustment of the optical axis is performed via the vibration of the first lens 112, so that an overall image resolution are not subjected to an influence of the vibration. For example, when the optical axis C of the zoom lens 100 deviates towards the first quadrant, and deviates to a coordinate R1 of (0.005, 0.005), the optical axis of the first lens 112 also deviates towards the first quadrant and to the coordinate R1' of (0.03481, 0.03481) to perform the adjustment. The coordinate falls, for example, on a plane, which is substantially parallel to the first direction D1 and the second direction D2, and substantially perpendicular to the optical axis C. Similarly, when the optical axis C of the zoom lens 100 deviates towards the second quadrant, and deviates towards to a coordinate R2 of (−0.005, 0.005), the optical axis of the first lens 112 also deviates towards the second quadrant and to the coordinate R2' of (−0.03481, 0.03481) to perform the adjustment. Similarity, when the optical axis C of the zoom lens 100 deviates towards a third quadrant, and deviates towards a coordinate R3 of (−0.005, −0.005), the optical axis C of the first lens 112 also deviates towards the third quadrant and to the coordinate R3' of (−0.03481, −0.03481) to perform the adjustment. Similarly, when the optical axis C of the zoom lens 100 deviates towards a fourth quadrant, and deviates to a coordinate R4 of (0.005, −0.005), the optical axis C of the first lens 112 also deviates towards the fourth quadrant and to the coordinate R4' of (0.03481, −0.03481) to perform the adjustment.

TABLE 1

| Deviation of the optical axis of the zoom lens | | | Deviation of the first lens | | |
|---|---|---|---|---|---|
| Coordinate | X | Y | Coordinate | X | Y |
| R1 | 0.005 | 0.005 | R1' | 0.03481 | 0.03481 |
| R2 | −0.005 | 0.005 | R2' | −0.03481 | 0.03481 |
| R3 | −0.005 | −0.005 | R3' | −0.03481 | −0.03481 |
| R4 | 0.005 | −0.005 | R4' | 0.03481 | −0.03481 |

The following provides an embodiment of the zoom lens module 1000 as an example. It is noted that the invention is not limited to the data information listed in the following Table 2, Table 3 and Table 4. It will be apparent to those skilled in the art that various modifications and variations may be made to the parameters and the configurations of the invention after referring to the invention without departing from the scope or spirit of the invention.

TABLE 2

| Surface | Radius of curvature (mm) | Interval (mm) | Refractive index | Abbe number | Remark |
|---|---|---|---|---|---|
| S1 | −22.25 | 0.6 | 1.77 | 49.6 | First lens |
| S2 | 4.64 | 1.4 | | | |
| S3 | Infinite | 2.3 | 1.92 | 20.9 | Prism |
| S4 | Infinite | 2.3 | 1.92 | 20.9 | |
| S5 | Infinite | 0.1 | | | |
| S6 | 384.13 | 0.6 | 1.53 | 56.0 | Second lens |
| S7 | 25.87 | 6.5 | | | |
| S8 | 5.57 | 1.5 | 1.49 | 70.4 | Third lens |
| S9 | 43.87 | 0.7 | | | |
| S10 | Infinite | 0.7 | | | Aperture stop |
| S11 | 6.46 | 2.0 | 1.51 | 63.3 | Fourth lens |
| S12 | −5.91 | 0.85 | | | |
| S13 | −18.08 | 0.6 | 1.80 | 46.6 | Fifth lens |
| S14 | 4.00 | 1.9 | 1.49 | 70.4 | Sixth lens |
| S15 | −5.86 | 0.1 | | | |
| S16 | 12.42 | 1.6 | 1.50 | 81.6 | Seventh lens |
| S17 | −5.03 | 0.6 | 1.85 | 32.2 | Eighth lens |
| S18 | 5.03 | 0.85 | | | |
| S19 | 5.98 | 2.3 | 1.70 | 30.1 | Ninth lens |
| S20 | −10.17 | 0.8 | | | |
| S21 | −2.67 | 0.6 | 1.63 | 23.4 | Tenth lens |
| S22 | −3.51 | 0.7 | | | |
| S23 | Infinite | 0.3 | 1.52 | 64.1 | Cover glass |
| S24 | Infinite | 0.3 | | | |

In Table 2, the radius of curvature is a radius of curvature of each surface, and the interval is a straight distance on the optical axis C between two adjacent surfaces. For example, the interval of the surface S1 is a straight distance on the optical axis C between the surface S1 to the surface S2. The thickness, the refractive index and the Abbe number corresponded by each lens in the remark column are in reference to the values of the interval, the refractive index and the Abbe number in each column.

In addition, in Table 2, surfaces S1 and S2 are two surfaces of the first lens 112. Surfaces S3, S4 and S5 respectively are a light incident surface, a reflecting surface 114a and a light emitting surface of the prism 114. Surfaces S6 and S7 are two surfaces of the second lens 116. Surfaces S8 and S9 are two surfaces of the third lens 122. Surface S10 is the aperture stop 150. Surfaces S11 and S12 are two surfaces of the fourth lens 124. Surface S13 is a surface of the fifth lens 132 which faces towards the object side, surface S14 is a surface connecting the fifth lens 132 and the sixth lens 134, and surface S15 is a surface of the sixth lens 134 which faces towards the image side. Surface S16 is a surface of the seventh lens 136 which faces towards the object side, surface S17 is a surface connecting the seventh lens 136 and the eighth lens 138, and surface S18 is a surface of the eighth lens 138 which faces towards the image side. Surfaces S19 and S20 are two surfaces of the ninth lens 142. Surfaces S21 and S22 are two surfaces of the tenth lens 144. Surfaces S23 and S24 are two surfaces of the cover glass 160. The interval value of the column of the surface S18 is a distance from surface S18 to the image side.

The abovementioned surfaces 51, S2, S6, S7, S11, S12, S21, and S22 are aspheric surfaces, and an aspheric formula is as follows:

$$Z(y) = \frac{cy^2}{1+\sqrt{1-(1+K)c^2y^2}} + A_1 y^2 + A_2 y^4 + A_3 y^6 + A_4 y^8 + A_5 r^{10}$$

In the aspheric formula, Z is a sag of the direction along the optical axis, and c is a reciprocal of a radius of an osculating sphere, namely, the reciprocal of a radius of curvature (e.g., the radius of curvature S1 and S2 in the Table) near to the optical axis C. K is a conic constant, y is a vertical height of the aspheric surface from the optical axis C, namely, the height from a center of the lens to an edge of the lens, and $A_1 \sim A_5$ are aspheric coefficients, wherein the coefficient $A_1$ is 0. Table 2 lists the coefficient values of the surfaces S1, S2, S6, S7, S11, S12, S21, and S22.

TABLE 3

| Aspheric coefficient | Conic constant K | Coefficient $A_4$ | Coefficient $A_6$ | Coefficient $A_8$ | Coefficient $A_{10}$ |
|---|---|---|---|---|---|
| S1 | 0 | 0.0072440399 | −1.6925102e−007 | −0.00015466713 | 3.6110449e−005 |
| S2 | 0 | 0.010123042 | 0.0005012713 | 0.0001039076 | −6.5301281e−005 |
| S6 | 0 | 0.0055546622 | 0.00069763699 | 5.3214983e−005 | −1.53203e−005 |
| S7 | 0 | 0.0038726618 | 0.00032901276 | 0.00015058828 | −3.24461e−005 |
| S11 | 0 | −0.0033546799 | −0.00031310275 | 6.90293e−006 | −6.880011e−006 |
| S12 | 0 | 0.00034223786 | −0.00031514217 | −8.011285e−007 | −2.6456e−006 |
| S21 | 0 | 0.11286568 | −0.035928624 | 0.0093114992 | −0.0016959002 |
| S22 | 0 | 0.11216062 | −0.012511569 | −0.0065925063 | 0.0041120451 |

| Aspheric coefficient | Coefficient $A_{12}$ | Coefficient $A_{14}$ | Coefficient $A_{16}$ |
|---|---|---|---|
| S1 | −4.414385e−006 | 2.78985e−007 | −7.1321e−009 |
| S2 | 2.4194304e−005 | −3.62800e−006 | 1.9093e−007 |
| S6 | 1.57387e−006 | 0 | 0 |
| S7 | 3.52010e−006 | 0 | 0 |
| S11 | 0 | 0 | 0 |
| S12 | 0 | 0 | 0 |
| S21 | 0.00021074812 | −1.656463e−005 | 6.66858e−007 |
| S22 | −0.00099965416 | 0.000119400 | −5.788893e−006 |

TABLE 4

|  | Wide-end | First middle location | Second middle location | Tele-end |
|---|---|---|---|---|
| Effective focal length (EFL) (mm) | 3.1 | 4.3 | 5.7 | 8.7 |
| F-number | 2.88 | 3.45 | 4.00 | 4.97 |
| Field of View (FOV) (2ω) | 74° | 57° | 44° | 29° |
| Interval of S7 (mm) | 6.5 | 4.5 | 2.8 | 0.4 |
| Interval of S12 (mm) | 0.85 | 1.15 | 1.65 | 3.02 |
| Interval of S18 (mm) | 0.85 | 2.50 | 3.70 | 4.75 |

Table 4 respectively lists several important coefficient values of the zoom lens module 1000 at the wide-end, the first middle location, the second middle location, and the tele-end, which include the effective focal length and the adjustable distances of the surfaces S7, S12 and S18, wherein data in the three interval rows of the surfaces S7, S12 and S18 respectively represents the distance between the surfaces S7, S12 and S18 at the wide-end, the first middle location, the second middle location, and the tele-end, respectively, to the next surfaces (e.g., S8, S13 and S19). Moreover, a range of the effective focal length of the zoom lens module 1000 in this embodiment is, for example, 3.2 to 8.7 mm, a range of the F-number is, for example, 2.9 to 5.2 mm, and a range of the field of view (FOV) (2ω) is, for example, 28 to 74 degrees. Besides, the zoom lens module 1000 corresponded to Table 2 to Table 4 satisfies the previous mentioned correlation formula (1) to (9).

Figure 2A:
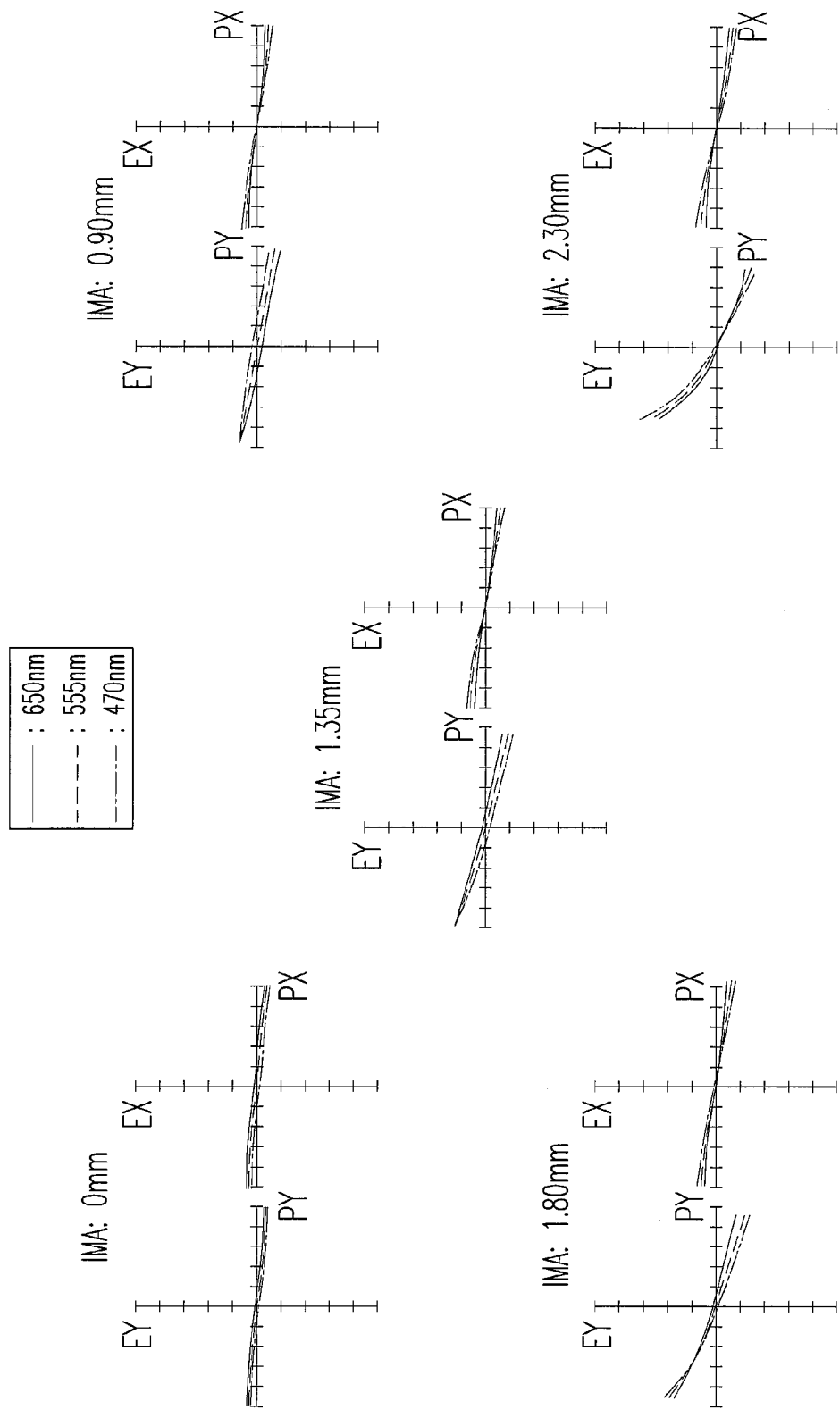
FIG. 2A to FIG. 2B are imaging optical simulation curves in correspondence to Table 2 and the zoom lens module, which is at a wide-end, in FIG. 1A.
Figure 2B:
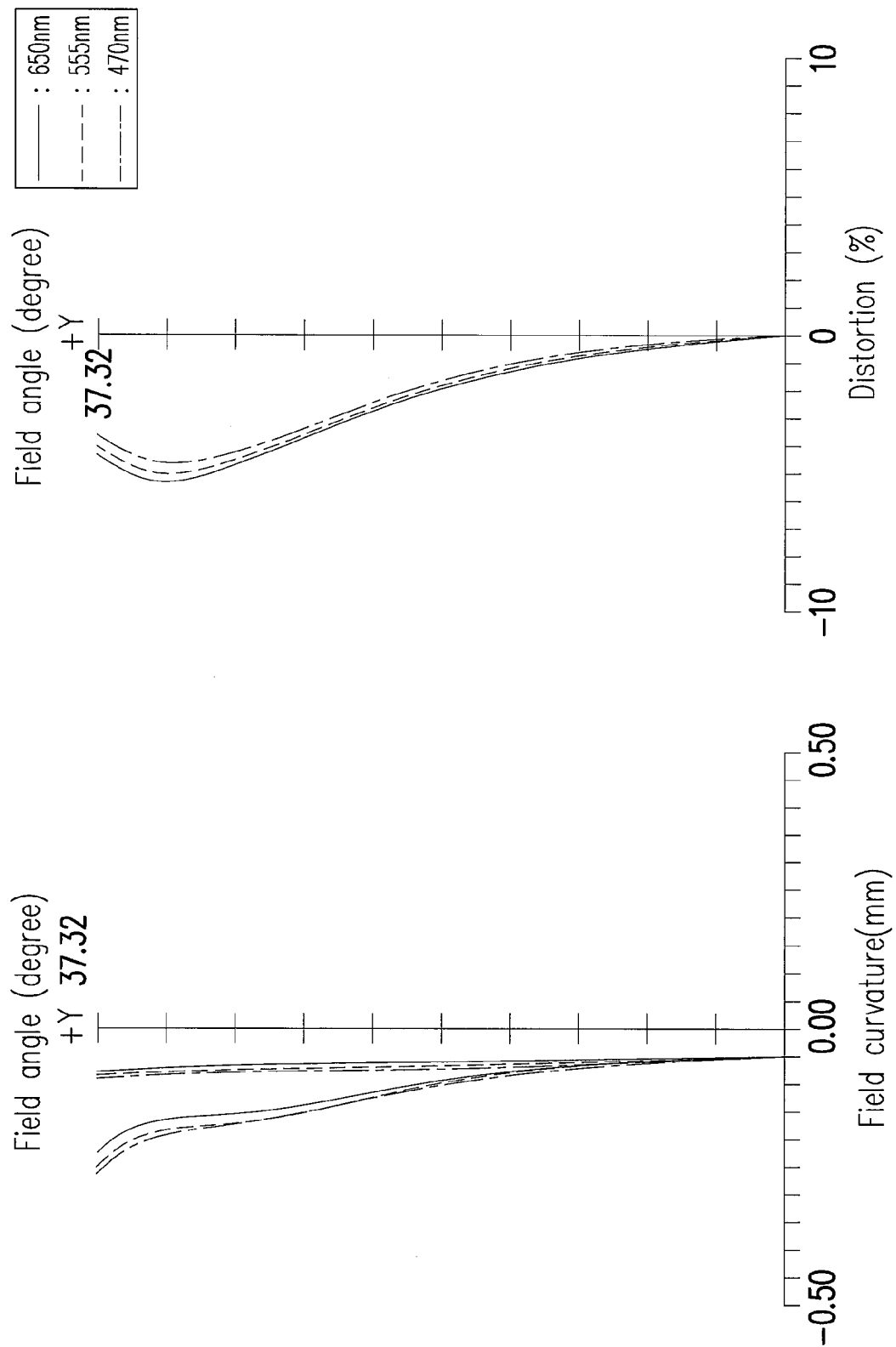
Figure 2C:
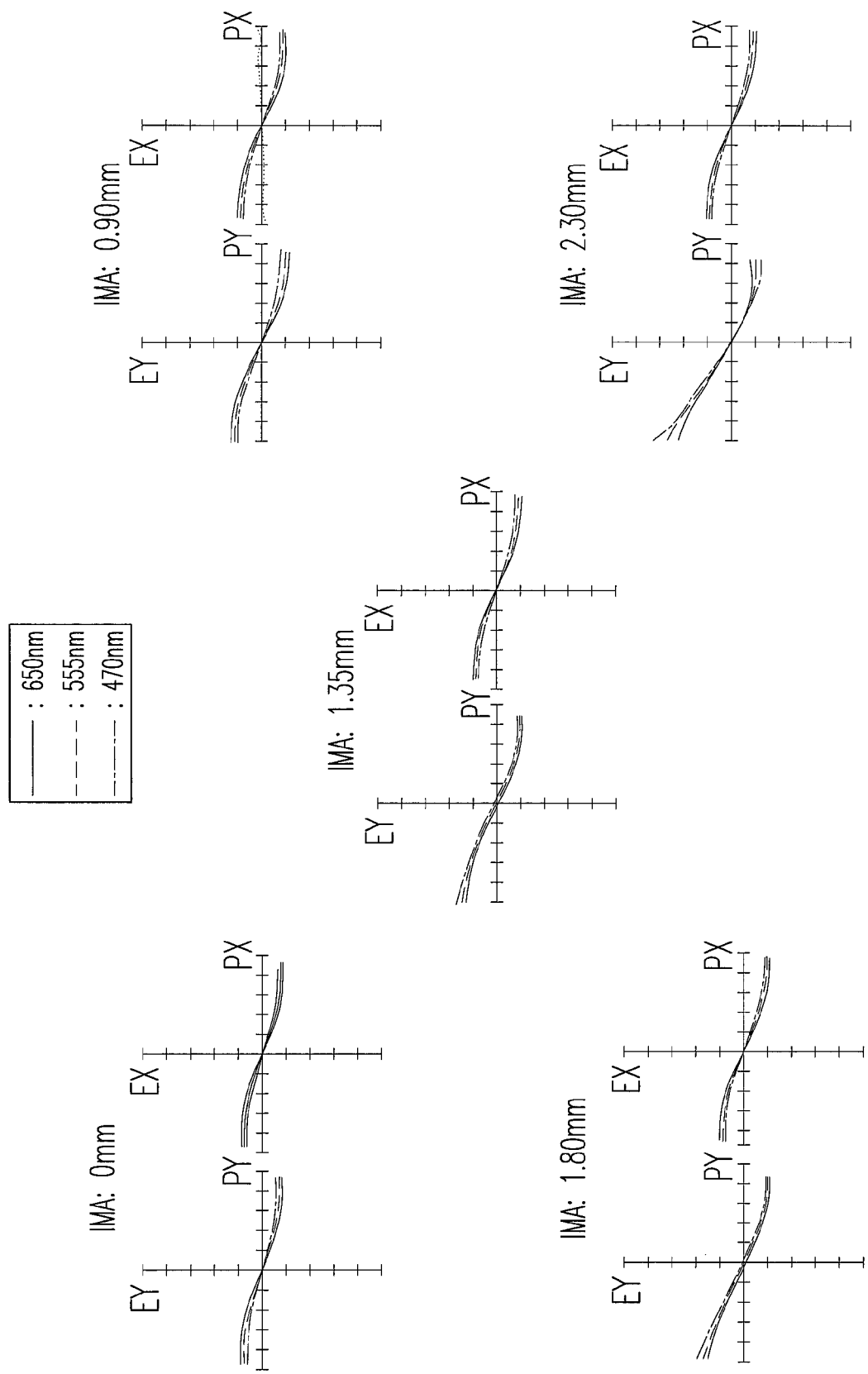
FIG. 2C to FIG. 2D are imaging optical simulation curves in correspondence to Table 2 and the zoom lens module, which is at a tele-end, in FIG. 1C.
Figure 2D:
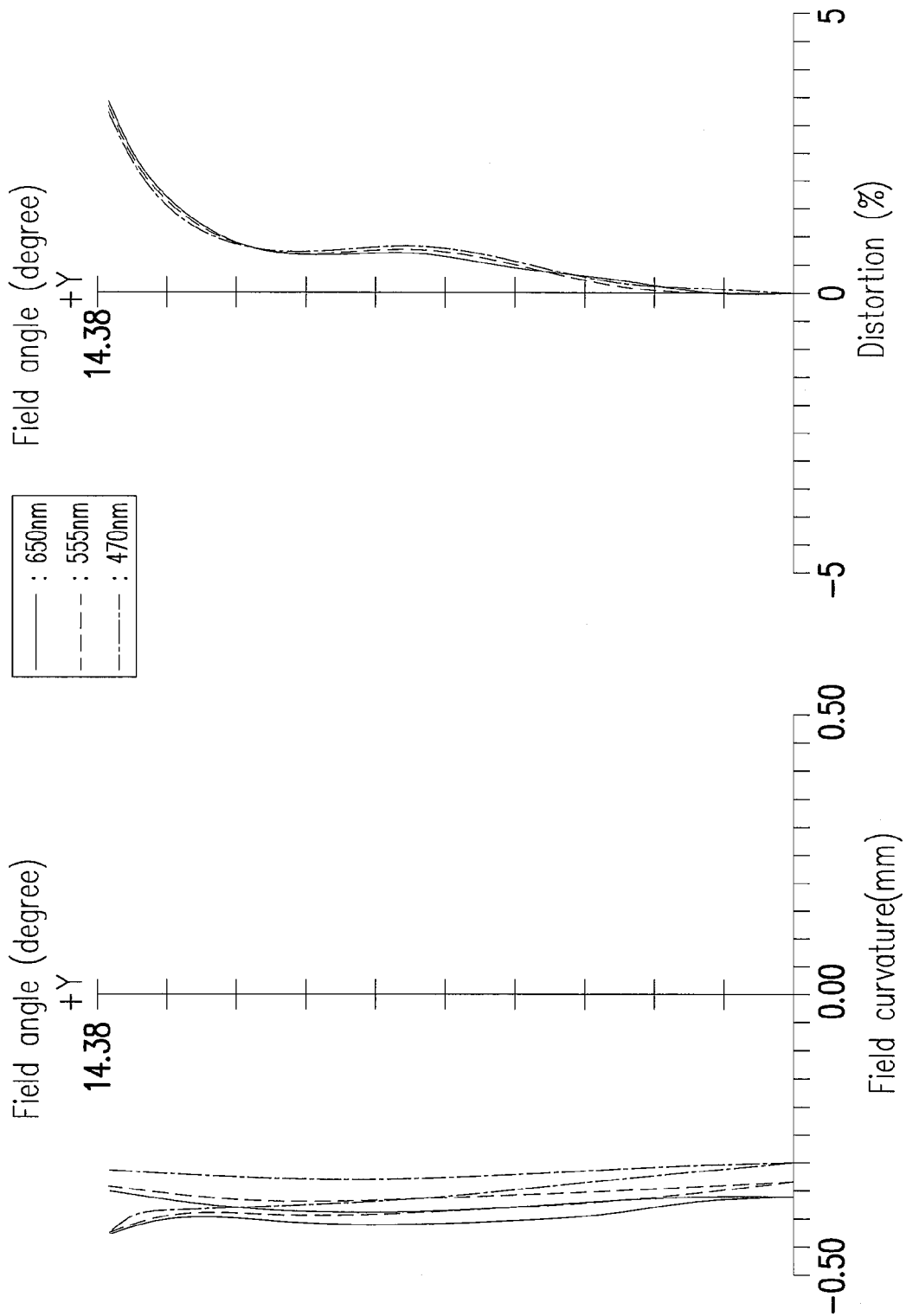

FIG. 2A to FIG. 2B are imaging optical simulation curves in correspondence to Table 2 and the zoom lens module 1000, which is at the wide-end, in FIG. 1A, and FIG. 2C to FIG. 2D are imaging optical simulation curves in correspondence to Table 2 and the zoom lens module 1000, which is at the tele-end, in FIG. 1C. Herein, a red light with a wavelength of 650 nm, a green light with a wavelength of 555 nm and a blue light with a wavelength of 470 nm are respectively used as reference wavebands to carry out simulation. FIG. 2A and FIG. 2C are transverse ray fan plots, and plots in each of FIG. 2B and FIG. 2D are sequentially, from the left to the right, a field curvature graph and a distortion. Since the graphs shown in FIG. 2A to FIG. 2C are all within standard ranges, the zoom lens module 1000 in this embodiment has the favorable imaging quality.

Figure 3:
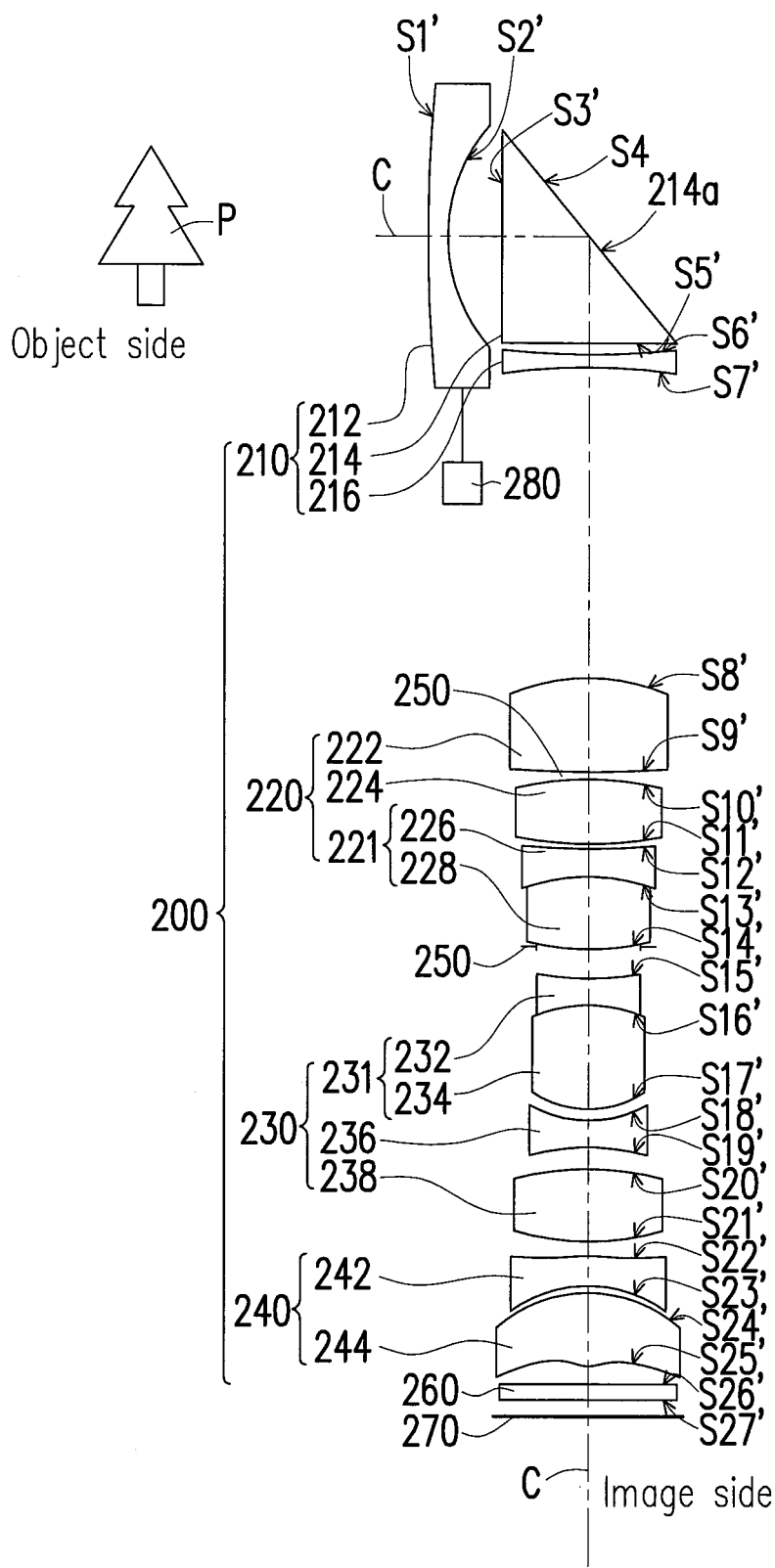
FIG. 3 is a structural diagram schematically illustrating a zoom lens module according to another embodiment of the invention.

FIG. 3 is a structural diagram schematically illustrating a zoom lens module according to another embodiment of the invention. Referring to FIG. 3, the zoom lens module 2000 in this embodiment is similar to the zoom lens module 1000 in FIG. 1A, and a main difference between the two is that a refractive power of the fourth group 240 of the zoom lens module 2000 in this embodiment is negative.

In detail, the first lens group 210 includes a first lens 212, a prism 214 and a second lens 216 sequentially arranged from the object side towards the image side, and refractive powers of the first lens 212 and the second lens 216 are both negative. In addition, the prism 214 has a reflecting surface 214a, and the reflecting surface 214a may reflect the light from the first lens 212 to the second lens 216. The second lens group 220 includes a third lens 222, a fourth lens 224, a fifth lens 226, and a sixth lens 228 sequentially arranged from the object side towards the image side, and refractive powers of the third lens 222, the fourth lens 224, the fifth lens 226, and the sixth lens 228 are positive, positive, negative, and positive, respectively. The third lens group 230 includes a seventh lens 232, an eighth lens 234, a ninth lens 236, and a tenth lens 238 sequentially arranged from the object side towards the image side, and refractive powers of the seventh lens 232, the eighth lens 234, the ninth lens 236, and the tenth lens 238 are negative, positive, negative, and positive, respectively. A refractive power of the fourth lens group 240 is negative, the fourth lens group 240 includes an eleventh lens 242 and a twelfth lens 244 sequentially arranged from the object side towards the image side, and refractive powers of the eleventh lens 242 and the twelfth lens 244 are negative and positive, respectively.

The first lens 212 is a negative meniscus lens with a convex surface facing the object side, and the second lens 216 is a biconcave lens. The third lens 222 is a biconvex lens, the fourth lens 224 is a biconvex lens, the fifth lens 226 is a biconcave lens, and the sixth lens 228 is a biconvex lens. The seventh lens 232 is a biconcave lens, and the eighth lens 234 is a biconvex lens. The ninth lens 236 is a biconcave lens, and the tenth lens 238 is a biconvex lens. The eleventh lens 242 is a negative meniscus lens with a concave surface facing the image side, and the twelfth lens 244 is a biconvex lens. In addition, the first lens 212, the second lens 216, the third lens 222, the eleventh lens 242, and the twelfth lens 244 may each be an aspherical lens.

On other hand, the zoom lens 200 may satisfy the following conditions:

$$30<Vp<40, 20<V1<30 \text{ and } 50<V2<60 \quad (10)$$

wherein Vp is the Abbe number of the prism 214, V1 is the Abbe number of the eleventh lens 242, and V2 is the Abbe number of the twelfth lens 244.

It is noted that since the structure of the zoom lens module 2000 is similar to the structure of the zoom lens module 1000, the main difference is that the refractive power of the fourth lens group 240 of the zoom lens module 2000 is negative. Therefore, the zoom lens module 2000 also has the same advantage as the zoom lens module 1000. In other words, if the zoom lens module 2000 satisfies at least one of the above mentioned correlation formula (1) to correlation formula (8), an overall size and the optical quality thereof may have a favorable performance.

The following provides an embodiment of the zoom lens module 2000 as an example. It is noted that the invention is not limited to the data information listed in the following Table 5, Table 6, and Table 7. It will be apparent to those skilled in the art that various modifications and variations may be made to the parameters and the configurations of the invention after referring to the invention without departing from the scope or spirit of the invention.

TABLE 5

| Surface | Radius of curvature (mm) | Interval (mm) | Refractive index | Abbe number | Remark |
|---|---|---|---|---|---|
| S1' | 54.43 | 0.6 | 1.68 | 53 | First lens |
| S2' | 3.54 | 1.3 | | | |
| S3' | Infinite | 2.3 | 1.83 | 37.2 | Prism |
| S4' | Infinite | 2.3 | 1.83 | 37.2 | |
| S5' | Infinite | 0.1 | | | |
| S6' | −73.22 | 0.6 | 1.53 | 56 | Second lens |
| S7' | 10.25 | 5.6 | | | |
| S8' | 4.63 | 1.8 | 1.58 | 59.4 | Third lens |
| S9' | −11.30 | 0.1 | | | |
| S10' | 11.08 | 1.3 | 1.5 | 81.6 | Fourth lens |
| S11' | −11.08 | 0.1 | | | |
| S12' | −30.82 | 0.6 | 1.79 | 47.4 | Fifth lens |
| S13' | 4.54 | 1.4 | 1.57 | 56.4 | Sixth lens |
| S14' | −5.81 | 0.5 | | | Aperture stop |
| S15' | −211.70 | 0.6 | 1.88 | 40.8 | Seventh lens |
| S16' | 3.01 | 2.0 | 1.5 | 81.6 | Eighth lens |
| S17' | −3.01 | 0.2 | | | |
| S18' | −3.00 | 0.6 | 1.83 | 42.7 | Ninth lens |
| S19' | 10.23 | 0.4 | | | |
| S20' | 6.43 | 1.4 | 1.85 | 32.2 | Tenth lens |

TABLE 5-continued

| Surface | Radius of curvature (mm) | Interval (mm) | Refractive index | Abbe number | Remark |
|---|---|---|---|---|---|
| S21' | −11.30 | 0.45 | | | |
| S22' | 16.35 | 0.6 | 1.63 | 23.4 | Eleventh lens |
| S23' | 2.41 | 0.1 | | | |
| S24' | 5.03 | 1.3 | 1.53 | 56 | Twelfth lens |
| S25' | −5.89 | 0.3 | | | |
| S26' | Infinite | 0.3 | 1.84 | 34.6 | Cover glass |
| S27' | Infinite | 0.3 | | | |

In Table 5, the radius of curvature is a radius of curvature of each surface, and the interval is a straight distance on the optical axis C between two adjacent surfaces. For example, the interval of the surface S1' is a straight distance on the optical axis C between the surface S1' to the surface S2'. The thickness, the refractive index and the Abbe number corresponded by each lens in the remark column are in reference to the values of the interval, the refractive index and the Abbe number in each column.

In addition, in Table 5, surfaces S1' and S2' are two surfaces of the first lens 212. Surfaces S3', S4' and S5' respectively are a light incident surface, a reflecting surface and a light emitting surface of the prism 214. Surfaces S6' and S7' are two surfaces of the second lens 216. Surfaces S8' and S9' are two surfaces of the third lens 222. Surfaces S10' and S11' are two surfaces of the fourth lens 224. Surface S12' is a surface of the fifth lens 226 which faces towards the object side, surface S13' is a surface connecting the fifth lens 226 and the sixth lens 228, and surface S14' is a surface of the sixth lens 228 which faces towards the image side, and surface S14' is an aperture stop 250. Surface S15' is a surface of the seventh lens 232 which faces towards the object side, surface S16' is a surface connecting the seventh lens 232 and the eighth lens 234, and surface S17' is a surface of the eighth lens 234 which faces towards the image side. Surfaces S18' and S19' are two surfaces of the ninth lens 236. Surfaces S20' and S21' are two surfaces of the tenth lens 238. Surfaces S22' and S23' are two surfaces of the eleventh lens 242. Surfaces S24' and S25' are two surfaces of the twelfth lens 244. Surfaces S26' and S27' are two surfaces of the cover glass 260. The interval value of the row of the surface S27' is a distance from surface S27' to the image side.

The abovementioned surfaces S1', S2', S6', S7', S8, S9', S22', S23', S24', and S25' are aspheric surfaces, and an aspheric formula is as follows:

$$Z(y) = \frac{cy^2}{1+\sqrt{1-(1+K)c^2y^2}} + A_1y^2 + A_2y^4 + A_3y^6 + A_4y^8 + A_5y^{10}$$

In the aspheric formula, Z is a sag along the direction of the optical axis, c is a reciprocal of a radius of an osculating sphere, namely the reciprocal of a radius of curvature (e.g., the radius of curvature S1' and S2' in the Table) near to the optical axis C. K is a conic constant, y is a vertical height of the aspheric surface from the optical axis C, namely the height from a center of the lens to an edge of the lens, and $A_1 \sim A_5$ are aspheric coefficients, wherein the coefficient $A_1$ is 0. Table 5 lists the coefficient values of the surfaces S1', S2', S6', S7', S8', S9', S22', S23', S24', and S25'.

TABLE 6

| Aspheric coefficient | Conic constant K | Coefficient $A_4$ | Coefficient $A_6$ | Coefficient $A_8$ | Coefficient $A_{10}$ |
|---|---|---|---|---|---|
| S1' | 0 | 0.0041613945 | −0.00071342893 | 0.00011842584 | −9.2772e−006 |
| S2' | 0 | 0.0054254451 | −0.00016637829 | −0.00011629665 | 7.693456e−005 |
| S6' | 0 | −0.0022631187 | 0.00054428344 | 0.00023149572 | −0.00011121539 |
| S7' | 0 | −0.0023964451 | −0.0012525468 | 0.0013011038 | −0.00048216398 |
| S8' | 0 | 0.00035877422 | 1.9547037e−006 | 6.9615396e−005 | −2.5548647e−006 |
| S9' | 0 | 0.0049582848 | 0.00010406492 | 7.3903631e−005 | 2.4824439e−006 |
| S22' | 0 | −0.12921686 | 0.12886778 | −0.072811111 | 0.022970382 |
| S23' | 0 | −0.19468861 | 0.13024186 | −0.051165362 | 0.011641878 |
| S24' | 0 | 0.012701045 | −0.053325626 | 0.039581894 | −0.012237065 |
| S25' | 0 | 0.12881331 | −0.044392673 | −0.017652856 | 0.01928891 |

| Aspheric coefficient | Coefficient $A_{12}$ | Coefficient $A_{14}$ | Coefficient $A_{16}$ |
|---|---|---|---|
| S1' | 2.48669e−007 | 0 | 0 |
| S2' | −8.00852e−006 | 0 | 0 |
| S6' | 2.16651e−005 | −1.86327e−006 | 0 |
| S7' | 8.70225e−005 | −6.39867e−006 | 0 |
| S8' | 0 | 0 | 0 |
| S9' | 0 | 0 | 0 |
| S22' | −0.00371 | 0.000235 | 0 |
| S23' | −0.001322 | 4.81249e−005 | 0 |
| S24' | 0.001787109 | −0.00010229557 | 0 |
| S25' | −0.0061007851 | 0.00086350659 | −4.6984312e−005 |

TABLE 7

| | Wide-end | First middle location | Second middle location | Tele-end |
|---|---|---|---|---|
| Effective focal length (EFL) (mm) | 3.1 | 4.2 | 5.5 | 8.4 |
| F-number | 2.9 | 3.5 | 4.2 | 5.6 |
| Field of View (FOV) (2ω) | 74° | 56° | 42° | 28° |
| Interval of S7' (mm) | 5.60 | 3.70 | 2.20 | 0.30 |
| Interval of S14' (mm) | 0.50 | 0.40 | 0.75 | 2.40 |
| Interval of S21' (mm) | 0.45 | 2.43 | 3.60 | 3.85 |

Table 7 respectively lists several important coefficient values of the zoom lens module 2000 at the wide-end, the first middle location, the second middle location, and the tele-end, which include the effective focal length and the adjustable distances of the surfaces S7', S14' and S21', wherein data in the three interval columns of the surfaces S7', S14' and S21' respectively represents the distance between the surfaces S7', S14' and S21' at the wide-end, the first middle location, the second middle location, and the tele-end, respectively, to the next surfaces (e.g., S8', S15' and S22'). Moreover, a range of the effective focal length of the zoom lens module 2000 in this embodiment is, for example, 3.1 to 8.5 mm, a range of the F-number is, for example, 2.8 to 5.6 mm, and a range of the field of view (FOV) (2ω) is, for example, 28 to 76 degrees. Besides, similar to the zoom lens module 1000, the zoom lens module 2000 corresponded to Table 5 to Table 7 satisfies the previous mentioned correlation formula (1) to (6) and (8).

Figure 4A:
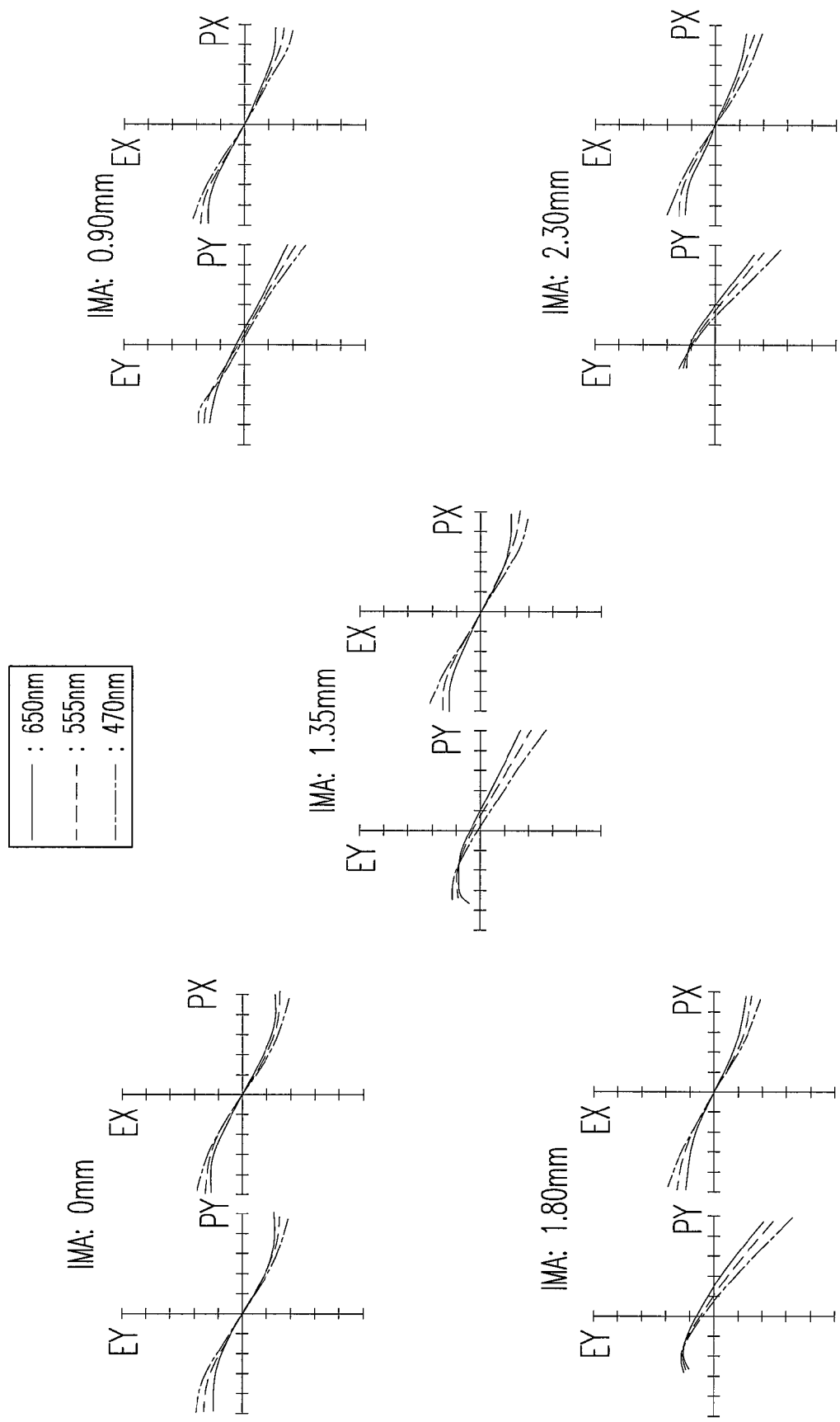
Figure 4C:
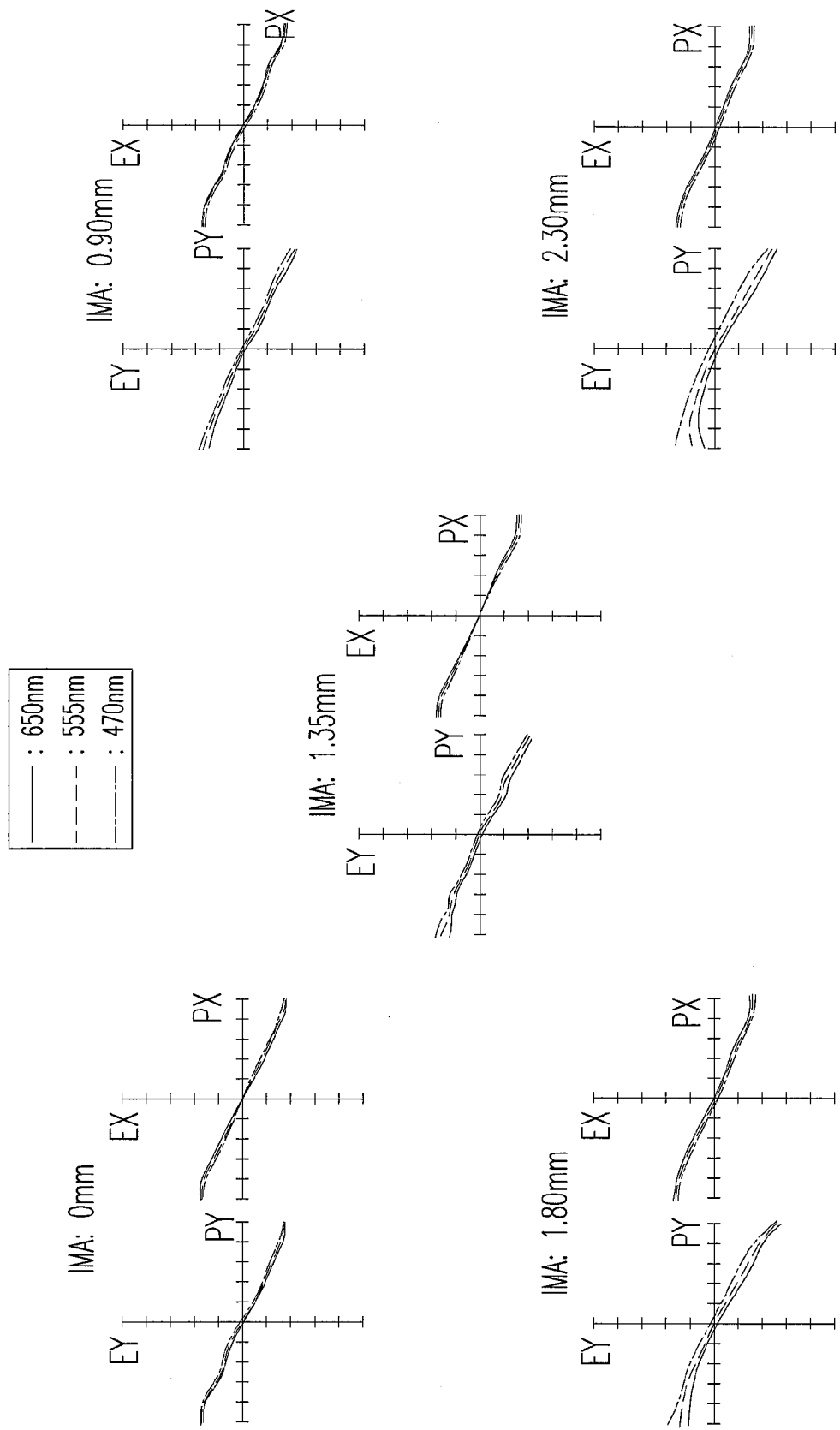

FIG. 4A to FIG. 4B are imaging optical simulation curves in correspondence to Table 4 and the zoom lens module 2000, which is at a wide-end, in FIG. 3, and FIG. 4C to FIG. 4D are imaging optical simulation curves in correspondence to Table 4 and the zoom lens module 2000, which is at a tele-end, in FIG. 3. Herein, a red light with a wavelength of 650 nm, a green light with a wavelength of 555 nm and a blue light with a wavelength of 470 nm are respectively used as reference wavebands to carry out simulation. FIG. 4A and FIG. 4C are transverse ray fan plots, and plots in each of FIG. 2B and FIG. 2D are sequentially, from the left to the right, a field curvature graph and a distortion. Since the graphs shown in FIG. 4A to FIG. 4D are all within standard ranges, the zoom lens module 2000 in this embodiment has the favorable imaging quality.

In summary, the embodiments of the invention may achieve at least one of the following advantages.

1. In the zoom lens module according to the embodiment of the invention, since the refractive powers of first lens group, the second lens group and the third lens group of the zoom lens are negative, positive and negative, respectively, and the first lens group and the fourth lens group each are a fixed group, the second lens group is capable of moving with respect to the first lens group to achieve zooming, and the third lens group is capable of moving with respect to the first lens group to achieve focusing. In addition, the zoom lens module satisfies 16≥C.R.A.(W)/ImgH≥10 and 15≥C.R.A.(T)/ImgH≥7. Hence, the zoom lens module may have the simple framework and the favorable optical imaging quality.

2. The zoom lens module according to the embodiments of the invention satisfies 1.90<|$T_{1G}/F_W$|<2.40, wherein $T_{1G}$ is the distance from the surface of the first lens 112 in the first lens group 110 which faces towards the object side to the surface of the second lens 116 in the first lens group 110 which faces towards the image side, namely, the distance along the optical axis C between the surface S1 to the surface S7. $F_W$ is the effective focal length at the wide-end. When |$T_{1G}/F_W$| is less than 1.90, the length of the first lens group 110 is lengthened, and thus unable to achieve the framework of miniaturization. When |$T_{1G}/F_W$| is greater than 2.40, the refractive power of the first lens group 110 is to become larger and causes an outer diameter of the first lens 112 in first lens group 110 to become larger, thus increasing a production cost and unable to achieve the framework of miniaturization.

3. In the zoom lens module according to the embodiments of the invention, an actuator may be selectively disposed, wherein the actuator may be connected to the first lens. When the zoom lens module vibrates towards a first direction with respect to the object, the actuator causes the first lens to deviate from the optical axis of the zoom lens module towards the first direction. Since the first lens may move in a same direction as that of the optical axis of the zoom lens module, the image formed on the image plane may be maintained in still. Therefore, the zoom lens module according to the embodiment of the invention does not result in a fuzzy image due to the vibrations during the shooting.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. Moreover, in the specification, the mentioned first lens (group), second lens (group), etc. represent the name of the elements, but are not intended to limit the upper bound and the lower bound of the quantities of the elements.

What is claimed is:

1. A zoom lens configured to form an image of an object at an object side onto an image plane at an image side, the zoom lens comprising:
a first lens group disposed between the object side and the image side and having a negative refractive power;
a second lens group disposed between the first lens group and the image side and having a positive refractive power;
a third lens group disposed between the second lens group and the image side and having a negative refractive power; and
a fourth lens group disposed between the third lens group and the image side, wherein the first lens group and the fourth lens group are each a fixed group, the second lens group is capable of moving with respect to the first lens group to achieve zooming, the third lens group is capable of moving with respect to the first lens group to achieve focusing, and the zoom lens satisfies $1.90 < T_{1G}/F_W < 2.40$, wherein $T_{1G}$ is a distance of the first lens group along an optical axis of the zoom lens, and $F_W$ is an effective focal length of the zoom lens at a wide-end, and wherein the first lens group comprises a first lens, a prism and a second lens sequentially arranged from the object side towards the image side, the second lens group further comprises an aperture stop, and the prism and the aperture stop satisfy $1 < CA_p(S3)/CA_{stp} < 1.8$, wherein $CA_p(S3)$ represents a clear aperture of prism facing towards the object side, and $CA_{stp}$ represents a clear aperture of the aperture stop.

2. The zoom lens as recited in claim 1, wherein the zoom lens satisfies $16 \geq C.R.A.(W)/ImgH \geq 10$ and $15 \geq C.R.A.(T)/ImgH \geq 7$, wherein C.R.A.(W) is an incident angle for a chief ray of the zoom lens at the wide-end incident on a maximum field of the image plane, C.R.A.(T) is an incident angle for a chief ray of the zoom lens at a tele-end incident on the maximum field of the image plane, and ImgH is a maximum image height of the image plane.

3. The zoom lens as recited in claim 1, wherein a refractive index of the prism is $Nd_p$, and $1.95 > Nd_p > 1.80$.

4. The zoom lens as recited in claim 1, wherein the zoom lens satisfies $0.9 < |F_{G2}/F_{G1}| < 1.5$, wherein $F_{G1}$ is an effective focal length of the first lens group, and $F_{G2}$ is an effective focal length of the second lens group.

5. The zoom lens as recited in claim 1, wherein the zoom lens satisfies $0.3 < |F_w/F_{G2}| < 0.9$ and $0.2 < |F_w/F_{G3}| < 0.9$, wherein $F_w$ is an effective focal length of the zoom lens at the wide-end, $F_{G2}$ is an effective focal length of the second lens group, and $F_{G3}$ is an effective focal length of the third lens group.

6. The zoom lens as recited in claim 1, wherein the zoom lens satisfies $TTL_W/TTL_T = 1$, wherein $TTL_W$ is a total track of the zoom lens at the wide-end, and $TTL_T$ is a total track of the zoom lens at a tele-end.

7. The zoom lens as recited in claim 1, wherein the zoom lens satisfies $9 \leq TTL_T/ImgH \leq 15$, wherein $TTL_T$ is a total track of the zoom lens at a tele-end, and ImgH is a maximum image height of the image plane.

8. A zoom lens configured to form an image of an object at an object side onto an image plane at an image side, the zoom lens comprising:
a first lens group disposed between the object side and the image side and having a negative refractive power;
a second lens group disposed between the first lens group and the image side and having a positive refractive power;
a third lens group disposed between the second lens group and the image side and having a negative refractive power; and
a fourth lens group disposed between the third lens group and the image side, wherein the first lens group and the fourth lens group are each a fixed group, the second lens group is capable of moving with respect to the first lens group to achieve zooming, the third lens group is capable of moving with respect to the first lens group to achieve focusing, and the zoom lens satisfies $1.90 < |T_{1G}/F_w| < 2.40$, wherein $T_{1G}$ is a distance of the first lens group along an optical axis of the zoom lens, and $F_w$ is an effective focal length of the zoom lens at a wide-end, and wherein an amount of lenses comprised within each of the second lens group, the third lens group and the fourth lens group is an even number.

9. The zoom lens as recited in claim 8, wherein an amount of lenses within the second lens group is two, an amount of lenses within the third lens group is four, and an amount of lenses within the fourth lens group is two.

10. The zoom lens as recited in claim 1, wherein the first lens group comprises two negative lenses sequentially arranged from the object side towards the image side, and the fourth lens group comprises a positive lens and a negative lens sequentially arranged from the object side towards the image side.

11. The zoom lens as recited in claim 1, wherein the third lens group comprises two cemented lenses, each of the cemented lenses comprises two spherical glass lenses, and no aspherical lens is comprised in the third lens group.

12. The zoom lens as recited in claim 1, wherein refractive powers of the first lens and the second lens are both negative; the second lens group comprises a third lens and a fourth lens sequentially arranged from the object side towards the image side, wherein refractive powers of the third lens and the fourth lens are both positive; the third lens group comprises a fifth lens, a sixth lens, a seventh lens, and an eighth lens sequentially arranged from the object side towards the image side, wherein refractive powers of the fifth lens, the sixth lens, the seventh lens, and the eighth lens are negative, positive, positive, and negative, respectively; a refractive power of the fourth lens group is positive, and the fourth lens group comprises a ninth lens and a tenth lens sequentially arranged from the object side towards the image side, wherein refractive powers of the ninth lens and the tenth lens are positive and negative, respectively; and the prism has a reflecting surface, wherein the reflecting surface reflects light from the first lens to the second lens.

13. The zoom lens as recited in claim 12, wherein the first lens is a biconcave lens, and the second lens is a negative meniscus lens with a concave surface facing the image side; the third lens is a negative meniscus lens with a convex surface facing the object side, and the fourth lens is a biconvex lens; the fifth lens is a biconcave lens, the sixth lens is a biconvex lens, the seventh lens is a biconvex lens, and the eighth lens is biconcave lens; the ninth lens is a biconvex lens, and the tenth lens is a negative meniscus lens with a convex surface facing the image side.

14. The zoom lens as recited in claim 12, wherein the first lens, the second lens, the fourth lens, and the tenth lens are each an aspherical lens.

15. The zoom lens as recited in claim 12, wherein the aperture stop of the second lens group is disposed between the third lens and the fourth lens.

16. The zoom lens as recited in claim 12, wherein the fifth lens and the sixth lens form a double cemented lens, and the seventh lens and the eighth lens form another double cemented lens.

17. The zoom lens as recited in claim 12, wherein the zoom lens satisfies $15<Vp<25$, $25<V1<35$ and $20<V2<30$, wherein Vp is an Abbe number of the prism, V1 is an Abbe number of the ninth lens, and V2 is an Abbe number of the tenth lens.

18. The zoom lens as recited in claim 1, wherein refractive powers of the first lens and the second lens are both negative; the second lens group comprises a third lens, a fourth lens, a fifth lens, and a sixth lens sequentially arranged from the object side towards the image side, wherein refractive powers of the third lens, the fourth lens, the fifth lens, and the sixth lens are positive, positive, negative, and positive, respectively; the third lens group comprises a seventh lens, an eighth lens, a ninth lens, and a tenth lens sequentially arranged from the object side towards the image side, wherein refractive powers of the seventh lens; the eighth lens; the ninth lens; and the tenth lens are negative, positive, negative, and positive, respectively; a refractive power of the fourth lens group is negative, and the fourth lens group comprises an eleventh lens and a twelfth lens sequentially arranged from the object side towards the image side, wherein refractive powers of the eleventh lens and the twelfth lens are negative and positive, respectively; and the prism has a reflecting surface, wherein the reflecting surface reflects light from the first lens to the second lens.

19. The zoom lens as recited in claim 18, wherein the first lens is a negative meniscus lens with a convex surface facing the object side, and the second lens is a biconcave lens; the third lens is a biconvex lens, the fourth lens is a biconvex lens, the fifth lens is a biconcave lens, and the sixth lens is a biconvex lens; the seventh lens is a biconcave lens, and the eighth lens is a biconvex lens; the ninth lens is a biconcave lens, and the tenth lens is a biconvex lens; the eleventh lens is a negative meniscus lens with a concave surface facing the image side, and the twelfth lens is a biconvex lens.

20. The zoom lens as recited in claim 18, wherein the first lens, the second lens, the third lens, the eleventh lens, and the twelfth lens are each an aspherical lens.

21. The zoom lens as recited in claim 18, wherein the aperture stop of the second lens group is disposed between the sixth lens and the seventh lens.

22. The zoom lens as recited in claim 18, wherein the fifth lens and the sixth lens form a double cemented lens, and the seventh lens and the eighth lens form another double cemented lens.

23. The zoom lens as recited in claim 18, wherein the zoom lens satisfies $30<Vp<40$, $20<V1<30$ and $50<V2<60$, wherein Vp is an Abbe number of the prism, V1 is an Abbe number of the eleventh lens, and V2 is an Abbe number of the twelfth lens.

24. The zoom lens as recited in claim 1, wherein when the second lens group and the third lens group move from a side adjacent to the fourth lens group towards to a side adjacent to the first lens group, the zoom lens changes from the wide-end to a tele-end.

25. A zoom lens module configured to form an image of an object at an object side onto an image plane at an image side, the zoom lens module comprising:
   a zoom lens comprising:
      a first lens group disposed between the object side and the image side and having a negative refractive power;
      a second lens group disposed between the first lens group and the image side and having a positive refractive power;
      a third lens group disposed between the second lens group and the image side and having a negative refractive power; and
      a fourth lens group disposed between the third lens group and the image side; and
   an optical detector disposed at the image side, wherein the zoom lens forms the image of the object onto the optical detector, the first lens group and the fourth lens group are each a fixed group, the second lens group is capable of moving with respect to the first lens group to achieve zooming, the third lens group is capable of moving with respect to the first lens group to achieve focusing, and the zoom lens satisfies $16 \geq C.R.A.(W)/ImgH \geq 10$ and $15 \geq C.R.A.(T)/ImgH \geq 7$, wherein C.R.A.(W) is an incident angle for a chief ray of the zoom lens at a wide-end incident on a maximum field of the optical detector, C.R.A.(T) is an incident angle for a chief ray of the zoom lens at a tele-end incident on the maximum field of the optical detector, and ImgH is a maximum image height of the optical detector.

26. The zoom lens module as recited in claim 25, wherein the first lens group comprises a first lens, a prism and a second lens sequentially arranged from the object side towards the image side, a refractive index of the prism is $Nd_p$, and $1.95 > Nd_p > 1.80$.

27. The zoom lens module as recited in claim 25, wherein the zoom lens satisfies $0.9 < |F_{G2}/F_{G1}| < 1.5$, wherein $F_{G1}$ is an effective focal length of the first lens group, and $F_{G2}$ is an effective focal length of the second lens group.

28. The zoom lens module as recited in claim 25, wherein the zoom lens satisfies $0.3 < |F_w/F_{G2}| < 0.9$ and $0.2 < |F_w/F_{G3}| < 0.9$, wherein $F_w$ is an effective focal length of the zoom lens at the wide-end, $F_{G2}$ is an effective focal length of the second lens group, and $F_{G3}$ is an effective focal length of the third lens group.

29. The zoom lens module as recited in claim 25, wherein the zoom lens satisfies $TTL_W/TTL_T=1$, wherein $TTL_W$ is a total track of the zoom lens at the wide-end, and $TTL_T$ is a total track of the zoom lens at the tele-end.

30. The zoom lens module as recited in claim 25, wherein the zoom lens satisfies $9 \leq TTL_T/ImgH \leq 15$, wherein $TTL_T$ is a total track of the zoom lens at the tele-end, and ImgH is a maximum image height of the optical detector.

31. The zoom lens module as recited in claim 25, wherein the first lens group comprises a first lens, a prism and a second lens sequentially arranged from the object side towards the image side, wherein refractive powers of the first lens and the second lens are both negative; the second lens group comprises a third lens and a fourth lens sequentially arranged from the object side towards the image side, wherein refractive powers of the third lens and the fourth lens are both positive; the third lens group comprises a fifth lens, a sixth lens, a seventh lens, and an eighth lens sequentially arranged from the object side towards the image side, wherein refractive powers of the fifth lens, the sixth lens, the seventh lens, and the eighth lens are negative, positive, positive, and negative, respectively; a refractive power of the fourth lens group is positive, and the fourth lens group comprises a ninth lens and a tenth lens sequentially arranged from the object side towards the image side, wherein refractive powers of the ninth lens and the tenth lens are positive and negative, respectively; and the prism has a reflecting surface, wherein the reflecting surface reflects light from the first lens to the second lens.

32. The zoom lens module as recited in claim 31, wherein the first lens is a biconcave lens, and the second lens is a negative meniscus lens with a concave surface facing the image side; the third lens is a negative meniscus lens with a convex surface facing the object side, and the fourth lens is biconvex lens; the fifth lens is a biconcave lens, the sixth lens is a biconvex lens, the seventh lens is a biconvex lens, and the eighth lens is a biconcave lens; the ninth lens is a biconvex lens, and the tenth lens is a negative meniscus lens with a convex surface facing the image side.

33. The zoom lens module as recited in claim 31, wherein the first lens, the second lens, the fourth lens, and the tenth lens are each an aspherical lens.

34. The zoom lens module as recited in claim 31, wherein the zoom lens satisfies $15 < Vp < 25$, $25 < V1 < 35$ and $20 < V2 < 30$, wherein Vp is an Abbe number of the prism, V1 is an Abbe number of the ninth lens, and V2 is an Abbe number of the tenth lens.

35. The zoom lens module as recited in claim 25, wherein the first lens group comprises a first lens, a prism and a second lens sequentially arranged form the object side towards the image side, wherein refractive powers of the first lens and the second lens are both negative; the second lens group comprises a third lens, a fourth lens, a fifth lens, and a sixth lens sequentially arranged from the object side towards the image side, wherein refractive powers of the third lens, the fourth lens, the fifth lens, and the sixth lens are positive, positive, negative, and positive, respectively; the third lens group comprises a seventh lens, an eighth lens, a ninth lens, and a tenth lens sequentially arranged from the object side towards the image side, wherein refractive powers of the seventh lens, the eighth lens, the ninth lens, and the tenth lens are negative, positive, negative, and positive, respectively; a refractive power of the fourth lens group is negative, and the fourth lens group comprises an eleventh lens and a twelfth lens sequentially arranged from the object side towards the image side, wherein refractive powers of the eleventh lens and the twelfth lens are negative and positive, respectively; and the prism has a reflecting surface, wherein the reflecting surface reflects light from the first lens to the second lens.

36. The zoom lens module as recited in claim 35, wherein the first lens is a negative meniscus lens with a convex surface facing the object side, and the second lens is a biconcave lens; the third lens is a biconvex lens, the fourth lens is a biconvex lens, the fifth lens is a biconcave lens, and the sixth lens is a biconvex lens; the seventh lens is a biconcave lens, the eighth lens is a biconvex lens, the ninth lens is a biconcave lens, and the tenth lens is a biconvex lens; the eleventh lens is a negative meniscus lens with a concave surface facing the image side, and the twelfth lens is a biconvex lens.

37. The zoom lens module as recited in claim 35, wherein the first lens, the second lens, the third lens, the eleventh lens, and the twelfth lens are each an aspherical lens.

38. The zoom lens module as recited in claim 35, wherein the zoom lens satisfies $30 < Vp < 40$, $20 < V1 < 30$ and $50 < V2 < 60$, wherein Vp is an Abbe number of the prism, V1 is an Abbe number of the eleventh lens, and V2 is an Abbe number of the twelfth lens.

39. A zoom lens configured to form an image of an object at an object side onto an image plane at an image side, the zoom lens comprising:
  a first lens group disposed between the object side and the image side and having a negative refractive power, the first lens group comprising a first lens, a prism and a second lens sequentially arranged from the object side towards the image side, wherein the first lens is connected to an actuator;
  a second lens group disposed between the first lens group and the image side and having a positive refractive power;
  a third lens group disposed between the second lens group and the image side and having a negative refractive power; and
  a fourth lens group disposed between the third lens group and the image side,
  wherein the first lens group and the fourth lens group are each a fixed group, the second lens group is capable of moving with respect to the first lens group to achieve zooming, the third lens group is capable of moving with respect to the first lens group to achieve focusing, the zoom lens satisfies $16 \geq C.R.A.(W)/ImgH \geq 10$ and $15 \geq C.R.A.(T)/ImgH \geq 7$ wherein C.R.A.(W) is an incident angle for a chief ray of the zoom lens at a wide-end incident on a maximum field of the image plane, C.R.A.(T) is an incident angle for a chief ray of the zoom lens at a tele-end incident on the maximum field of the image plane, and ImgH is a maximum image height of the image plane, wherein when the zoom lens vibrates towards a first direction, the actuator causes the first lens to deviate from an optical axis of the zoom lens towards the first direction.

40. The zoom lens as recited in claim 39, wherein the zoom lens satisfies $1.90<|T_{1G}/F_{W1}<2.40$, wherein $T_{1G}$ is a distance of the first lens group along an optical axis of the zoom lens, and $F_w$ is an effective focal length of the zoom lens at the wide-end.

41. The zoom lens as recited in claim 39, wherein the first lens group comprises a first lens, a prism and a second lens sequentially arranged from the object side towards the image side, the second lens group further comprises an aperture stop, and the prism and aperture stop satisfy $1<CA_p(S3)/CA_{stp}<1.8$, wherein $CA_p(S3)$ represents a clear aperture of the prism towards the object side, and $CA_{stp}$ represents a clear aperture of the aperture stop.

42. The zoom lens as recited in claim 39, wherein an amount of lenses comprised within each of the second lens group, the third lens group and the fourth lens group is an even number.

43. The zoom lens as recited in claim 42, wherein an amount of lenses within the second lens group is two, an amount of lenses within the third lens group is four, and an amount of lenses within the fourth lens group is two.

44. The zoom lens as recited in claim 39, wherein the first lens group comprises two negative lenses sequentially arranged form the object side towards the image side, and the fourth lens group comprises a positive lens and a negative lens sequentially arranged from the object side towards the image side.

45. The zoom lens as recited in claim 39, wherein the third lens group comprises two cemented lenses, each of the cemented lenses comprises two spherical glass lenses, and no aspherical lens is comprised in the third lens group.

\* \* \* \* \*